United States Patent
Hanaoka et al.

[11] Patent Number: 6,161,378
[45] Date of Patent: Dec. 19, 2000

[54] EXHAUST GAS PURIFICATION APPARATUS OF INTERNAL COMBUSTION ENGINE AND CATALYST FOR PURIFYING EXHAUST GAS INTERNAL COMBUSTION ENGINE

[75] Inventors: Hiroshi Hanaoka, Kodaira; Osamu Kuroda, Hitachi; Ryouta Doi, Naka-machi; Hidehiro Iizuka, Hitachinaka; Toshio Ogawa, Takahagi; Hisao Yamashita; Shigeru Azuhata, both of Hitachi; Yuichi Kitahara; Toshifumi Hiratsuka, both of Hitachinaka; Kojiro Okude, Hitachi; Norihiro Shinotsuka; Toshio Manaka, both of Hitachinaka, all of Japan

[73] Assignee: Hitachi, Ltd., Tokyo, Japan

[21] Appl. No.: 09/202,243

[22] PCT Filed: Jun. 9, 1997

[86] PCT No.: PCT/JP97/01955

§ 371 Date: Dec. 10, 1998

§ 102(e) Date: Dec. 10, 1998

[87] PCT Pub. No.: WO97/47864

PCT Pub. Date: Dec. 18, 1997

[30] Foreign Application Priority Data

| Jun. 10, 1996 | [JP] | Japan | 8-146981 |
| Jun. 14, 1996 | [JP] | Japan | 8-153718 |
| Aug. 8, 1996 | [JP] | Japan | 8-209587 |
| Jan. 28, 1997 | [JP] | Japan | 9-013655 |

[51] Int. Cl.$^7$ ................................................ F01N 3/00
[52] U.S. Cl. ........................ 60/286; 60/285; 60/295; 60/303; 422/177
[58] Field of Search .................... 60/286, 303, 274, 60/295, 297, 301, 299; 422/169, 170, 171, 177

[56] References Cited

U.S. PATENT DOCUMENTS 4,024,706  5/1977  Adawi et al. .
4,780,447  10/1988  Kim et al. .
4,868,148  9/1989  Henk et al. .
5,116,800  5/1992  Williamson et al. .

(List continued on next page.)

FOREIGN PATENT DOCUMENTS 0 272 136 A2  12/1987  European Pat. Off. .
0 351 197 A3  7/1989  European Pat. Off. .
0 598 916 A1  6/1993  European Pat. Off. .
0598 916 A1  6/1993  European Pat. Off. .

(List continued on next page.)

OTHER PUBLICATIONS

SAE Technical Paper Series 881585—"Engineered Control Strategies for Improved Catalytic Control of NOx in Lean Burn Applications"—Diwell et al—Oct. 10–13, 1988, pp. 1–10.

SAE Technical Paper Series 78067—"Effect of Air=Fuel Ratio Modulation on Conversion Efficiency of Three–Way Catalysts"—Kaneko et al, pp. 119–127—1988.

(List continued on next page.)

*Primary Examiner*—Thomas Denion
*Assistant Examiner*—Binh Tran
*Attorney, Agent, or Firm*—Evenson, McKeown, Edwards & Lenahan, P.L.L.C.

[57] ABSTRACT

An exhaust gas purification apparatus for use in an internal combustion engine comprises an exhaust gas duct connected to the engine through which exhaust gas containing $NO_x$ gas passes, and a catalyst disposed in the exhaust gas duct such that it contacts the exhaust gas. The catalyst chemically adsorbs $NO_x$ when a stoichiometric amount of a gaseous oxidizing agent present in the exhaust gas is larger than that of a gaseous reducing agent present in the exhaust gas for reducing $NO_x$, adsorbed $NO_x$ is catalytically reduced in the presence of a reducing agent when the stoichiometric amount of the oxidizing agent is not larger that of the reducing agent.

29 Claims, 19 Drawing Sheets

U.S. PATENT DOCUMENTS

| | | |
|---|---|---|
| 5,174,111 | 12/1992 | Nomura et al. . |
| 5,189,876 | 3/1993 | Hirota et al. . |
| 5,233,830 | 8/1993 | Takeshima et al. . |
| 5,331,809 | 7/1994 | Takeshima et al. . |
| 5,471,836 | 12/1995 | Takeshima et al. . |
| 5,472,673 | 12/1995 | Goto et al. ............................ 422/169 |
| 5,473,887 | 12/1995 | Takeshima et al. .................... 60/276 |
| 5,473,890 | 12/1995 | Takeshima et al. .................... 60/285 |
| 5,483,795 | 1/1996 | Katoh et al. ............................ 60/276 |
| 5,540,047 | 7/1996 | Dahlhemi et al. ..................... 60/274 |
| 5,595,060 | 1/1997 | Togai et al. . |
| 5,657,625 | 8/1997 | Koga et al. . |
| 5,804,152 | 9/1998 | Miyoshi et al. . |
| 5,849,254 | 12/1998 | Suzuki et al. . |
| 5,922,295 | 7/1999 | Chattha et al. ..................... 423/213.7 |
| 5,953,907 | 9/1999 | Kato et al. . |

FOREIGN PATENT DOCUMENTS

| | | |
|---|---|---|
| 61-112715 | 5/1986 | Japan . |
| 62-106826 | 5/1987 | Japan . |
| 62-117620 | 5/1987 | Japan . |
| 62-97630 | 5/1987 | Japan . |
| 63-61708 | 3/1988 | Japan . |
| 1-134020 | 5/1989 | Japan . |
| 3-124909 | 5/1991 | Japan . |
| 3-135417 | 6/1991 | Japan . |
| 4-141219 | 5/1992 | Japan . |
| 5-26080 | 2/1993 | Japan . |
| 5-133260 | 5/1993 | Japan . |
| 5-149130 | 6/1993 | Japan . |
| 5-231138 | 9/1993 | Japan . |
| 7-103012 | 4/1995 | Japan . |
| 7-103015 | 4/1995 | Japan . |
| 7-103016 | 4/1995 | Japan . |
| 7-103033 | 4/1995 | Japan . |
| 7-310534 | 11/1995 | Japan . |
| 8-121147 | 5/1996 | Japan . |
| 8-200049 | 8/1996 | Japan . |
| WO 93/07363 | 4/1993 | WIPO . |
| WO 93/08383 | 4/1993 | WIPO . |

OTHER PUBLICATIONS

JSAE Preprint 946—1994 "Development of NOx Storage Reduction Three–Way Catalyst System (Part 1)" Katoh et al, pp. 1–11.

Ind. eng. Chem. Prod. Res. Dev. Mar. 1983, vol. 22, No. 1, "Behavior of Automobile Exhaust Catalysts with Cycled Feedstreams" Taylor et al, pp 45–51.

JSAE Technical Series 882072–882166, "Dynamic Behavior Analysis of Three Way Catalytic Reaction" Yamamoto et al, 1988, pp. 1–10.

"Aspects of Automotive Catalyst Preparation, Performance and Durability", B.J. Cooper et al, 1987, pp. 117–123.

"Honda Develops New Engine That Offers High Fuel Efficiency and Excellent Performance" Honda Press Information Jul. 30, 1991 pp. 1–19.

"Development of NOx Storage–Reduction 3–Way Catalyst System", 1994 Kenji Katoh et al, pp. 41–44.

Toyota Press Information, Nov. 25, 1993, "Toyota Uses New Concept To Develop Three–Way Catalyst For Lean–Burn Engines", 3 pages.

"Development of a nitrogen oxides occlusion type catalyst for lean combustion engines of automobiles" Petrotech, 1996,pp. 472–476.

"Development of a lean burn system having a NOx occlusion–reducing type three–way catalyst", 1995, pp. 60–63.

"Developments of an NOx storage–reduction 3–way catalyst system", Kenji Katoh et al, 1996 pp. 68–73.

"Development of NOx storage–reduction 3–way catalyst system", Tanaka et al, 1995, pp. 34–38.

SAE Technical Paper Series—950809 "Development of New Concept Three–Way Catalyst for Automotive Lean–Burn Engines" Miyoshi et al, 1995, pp. 121–130.

"Development of NOx Storage–Reduction 3–way Catalyst System (II)—NOx Reduction Mechanism and Improvement of Conversion Efficiency" Tanaka et al, Tanaka et al, 1994, pp. 45–48.

Catalysis Today, "DeNOx catalyst for automotive lean–burn engine" Matsumoto, 1996, pp 43–44.

Catalysis Today, The new concept 3–way catalyst for automotive lean–burn engine: NOx storage and reduction catalyst, Takahashi et al, 1996, pp 63–69.

"Lean–burn engine—7A–FE model,", 1995 pp 180193.

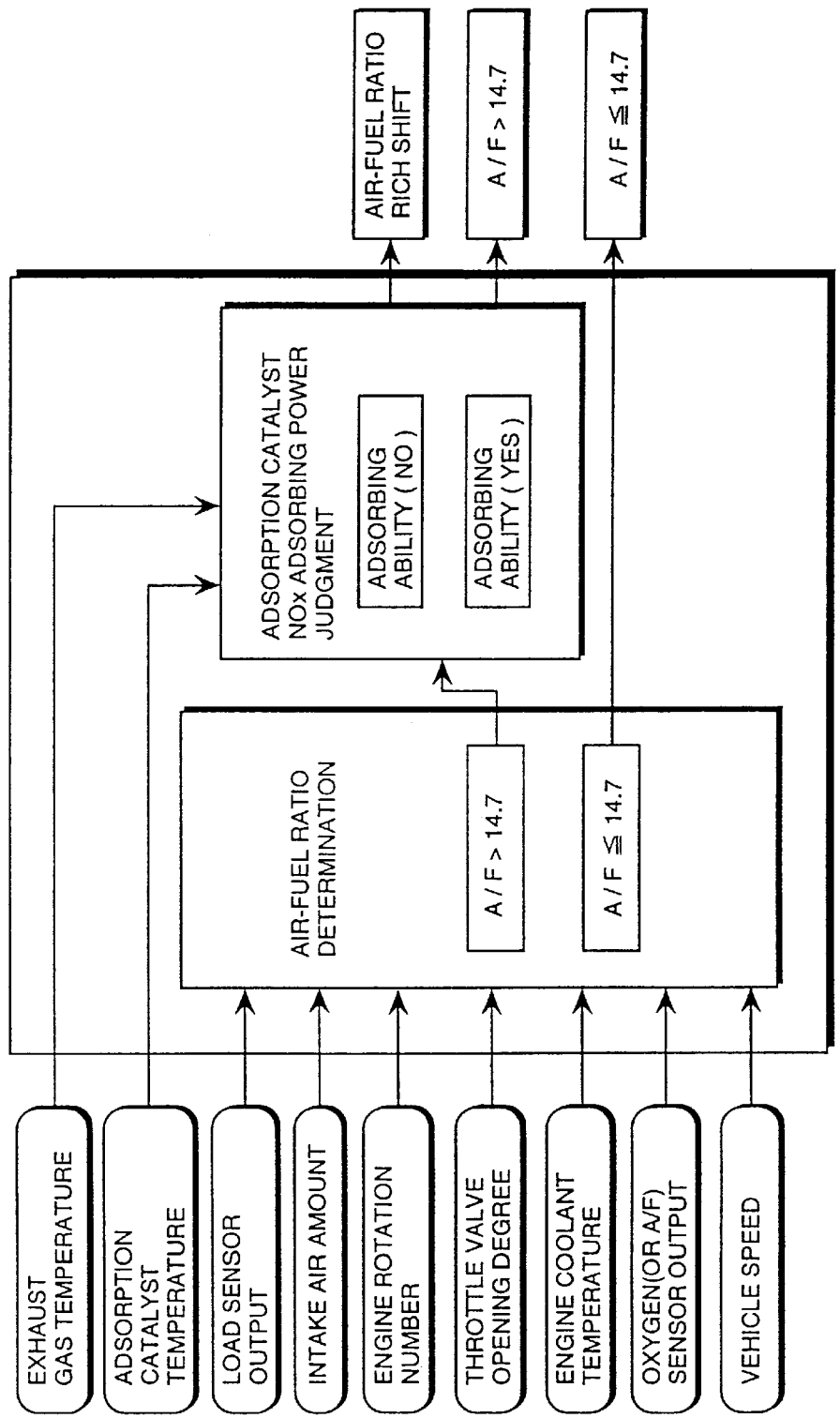

(a) ADSORPTION CATALYST N-N9

(b) ADSORPTION CATALYST N-K9

(c) COMPARISON CATALYST N-R2

EXHAUST GAS PURIFICATION APPARATUS OF INTERNAL COMBUSTION ENGINE AND CATALYST FOR PURIFYING EXHAUST GAS INTERNAL COMBUSTION ENGINE

CROSS REFERENCE TO RELATED APPLICATIONS

This application is related to the following co-pending U.S. patent applications Ser. No. 08/585,055, filed Jan. 11, 1996; Ser. No. 08/638,811, filed Apr. 29, 1996; Ser. No. 08/943,151, filed Oct. 3, 1997 (now U.S. Pat. No. 5,972,828); Ser. No. 08/958,673, filed Oct. 27, 1997 (now U.S. Pat. No. 5,968,870); and U.S. patent application Ser. No. 09/348,272, filed Oct. 27, 1997.

BACKGROUND OF THE INVENTION

This application claims the priority of Japanese patent documents No. 8-146981, filed Jun. 10, 1996; No. 8-153718, filed Jun. 14, 1996; and No. 8-209587, filed Aug. 8, 1996, the disclosures of which are expressly incorporated by reference herein.

The present invention relates to a purification apparatus for an exhaust gas which is discharged or emitted from an internal combustion engine such as an automobile, and particularly to an apparatus which includes a catalyst for purifying an exhaust gas from an internal combustion engine that is operated under a lean air-fuel ratio (a lean burn), and from an automobile which has such a lean burn internal combustion engine.

Exhaust gas discharged from an internal combustion engine such an automobile includes carbon monoxide (CO), hydrocarbon (HC) and nitrogen oxide ($NO_x$) etc. which pollute the environment, adversely affect the human body, and disturb the growth and the development of plants.

Accordingly, up to now a great deal of effort has gone into reducing the amount of such pollutants by improving a combustion in the internal combustion engine, and developing a method for purifying the discharged or the emitted exhaust gas using a catalyst to obtain a steady result.

Gasoline engine vehicles frequently utilize a three component catalyst in which platinum (Pt) and rhodium (Rh) are main active components. The oxidation of HC and CO and the reduction of $NO_x$ are carried out at the same time to convert the above air pollution materials to harmless materials.

It is characteristic of a three component catalyst, that it operates effectively only for exhaust gases which are generated within a range ("window") in the vicinity of a stoichiometric air-fuel ratio.

In the conventional technique, the air-fuel ratio fluctuates in accordance with an operation condition of the automobile. A fluctuation region is principally controlled to the vicinity of the stoichiometric air-fuel ratio, which is a ratio between A (weight of air) and F (weight of fuel), being about 14.7 in case of the gasoline. Hereinafter, in the present specification, the stoichiometric air-fuel ratio is represented by A/F=14.7, but this value varies in accordance with kinds of the fuels.

However, when the engine is operated under a lean air-fuel ratio in comparison with the stoichiometric air-fuel ratio atmosphere, the fuel consumption can be improved. Therefore, the development of a lean burn combustion technique is promoted; and recently automobiles have been developed in which the engine is combusted under the lean area having the air-fuel ratio of more than 18.

However, when a conventional three component catalyst is adopted for purification of a lean burn exhaust gas, although the oxidation purification with respect to HC and CO is performed effectively, the reduction of $NO_x$ is not.

Accordingly, to promote the application of the lean burn system for large size vehicles and to enlarge the lean burn combustion time (that is, enlarge the operation area of the lean burn system), it is necessary to develop an exhaust gas purification technique which is suitable to the lean burn system. Thus, the development of a technique for purifying HC, CO and particularly $NO_x$ where a large quantity of oxygen ($O_2$) is included in the exhaust gas, has been promoted vigorously.

Japanese patent laid-open publication No. 61,706/1988 discloses a technique in which HC is supplied upstream of a lean burn exhaust gas. The operation of a catalyst is facilitated by lowering the oxygen ($O_2$) concentration in the exhaust gas to a concentration area for effective functioning of the catalyst.

Japanese patent laid-open publication No. 97,630/1987, Japanese patent laid-open publication No. 106,826/1987 and Japanese patent laid-open publication No. 117,620/1987, propose a technique in which N included in the exhaust gas (after the conversion of an easily absorbable $NO_2$ by oxidizing NO) is absorbed and removed by contact with a catalyst having $NO_x$ absorbing ability. When the absorption efficiency decreases, by stopping a passing-through of the exhaust gas accumulated $NO_x$ is reduction-removed using $H_2$, HC included in a methane gas and a gasoline etc., and so that $NO_x$ absorbing ability of the catalyst is regenerated.

Further, WO 93/07363 and WO 93/08383 discloses an exhaust gas purification apparatus in which an $NO_x$ absorbent material arranged at an exhaust gas flow passage absorbs $NO_x$ from a lean exhaust gas, and when an oxygen concentration in the exhaust gas is lowered the $NO_x$ absorbent material discharges the absorbed $NO_x$. The exhaust gas absorbs $NO_x$ during the lean atmosphere and the absorbed $NO_x$ is discharged by lowering $O_2$, concentration in the exhaust gas which flows into a $NO_x$ absorbent.

However, in Japanese patent laid-open publication No. 61,708/1988, to attain a composition of the exhaust gas which corresponds to the air-fuel ratio of A/F=14.7 where the catalyst can function ($O_2$ concentration having about 0.5%), it needs a very large quantity of HC. A use of a blow-by gas in this patent document is effective, but the blow-by gas does not have an amount which is sufficient for efficient treatment of an exhaust gas during an operation of an internal combustion engine. It is possible technically to throw the fuel but it eliminates the fuel consumption gains achieved by the lean burn system.

In Japanese patent laid-open publication No. 97,630/1987, Japanese patent laid-open publication No. 106,826/1987 and Japanese patent laid-open publication No. 117,620/1987, to regenerate a $NO_x$ absorbent material a flow of exhaust gas is stopped and the gaseous reducing agent of HC etc. is contacted to $NO_x$ absorbent. Further, two $NO_x$ absorbent materials are provided and the exhaust gas flows alternately to these two $NO_x$ absorbent materials. It is therefore necessary to provide an exhaust gas change-over mechanism, which complicates the structure of the exhaust gas treatment apparatus.

In WO 93/07363 and WO 93/08383, the exhaust gas is flowed continuously to an $NO_x$ absorbent material, and the $NO_x$ in the exhaust gas is absorbed during the lean atmosphere. By lowering $O_2$ concentration in the exhaust gas, the absorbed $NO_x$ is discharged and the $NO_x$ absorbent material is regenerated. Accordingly, since the change-over of the exhaust gas flow is unnecessary, the problem in the above stated system can resolved. However, these systems require a material which can absorb $NO_x$ during the lean condition and can discharge $NO_x$ when $O_2$ concentration in the exhaust gas is lowered. Since the repeated $NO_x$ absorption and discharge inevitably causes a periodic change of a crystal structure of the absorbent, it is necessary to take a careful consideration about the durability of the absorbent. Further, it is necessary to treat the discharged $NO_x$; in the case of a large quantity of the discharged $NO_x$ it may be necessary to provide a post-treatment using a three component catalyst.

SUMMARY OF THE INVENTION

In the light of the problems in the above stated prior arts, the object of the present invention is to provide an internal combustion engine exhaust gas purification apparatus which has a simple structure, consumes a small amount of gaseous reducing agents, has superior endurance and which effectively removes harmful components such as $NO_x$ from a lean burn exhaust gas converting them to a harmless component.

Another object of the present invention is to provide a catalyst for use in an exhaust gas purification apparatus of an internal combustion engine.

According to the present invention, an exhaust gas purification apparatus for use in an internal combustion engine comprises an exhaust gas duct connected to the engine, through which the exhaust gas containing $NO_x$ gas passes, and a catalyst disposed in the exhaust gas duct so that it contacts the exhaust gas. The catalyst chemically adsorbs $NO_x$ when a stoichiometric amount of a gaseous oxidizing agent present in the exhaust gas is larger than the amount of a gaseous reducing agent present in the exhaust gas for reducing $NO_x$, while adsorbed $NO_x$ is catalytically reduced in the presence of the reducing agent when the stoichiometric amount of the oxidizing agent is not larger that of the reducing agent.

According to the present invention, an apparatus for purifying an exhaust gas from an internal combustion engine comprises an exhaust gas duct connected to the engine, through which the exhaust gas containing $NO_x$ gas passes, and a catalyst disposed in the exhaust gas duct so that it contacts the exhaust gas. The catalyst adsorbs $NO_x$ under when the amount of a gaseous oxidizing agent present in the exhaust gas is larger than that of a gaseous reducing agent for $NO_x$ added to the exhaust gas in a stoichiometric relation, while adsorbed $NO_x$ is catalytically reduced in the presence of the reducing agent when the amount of the oxidizing agent is not larger that of the reducing agent in the stoichiometric relation.

According to the present invention, an apparatus for purifying an exhaust gas from an internal combustion engine comprises an exhaust gas duct connected to the engine, through which the exhaust gas containing $NO_x$ gas passes, and a catalyst disposed in the exhaust gas duct so that it contacts with the exhaust gas. The catalyst adsorbs $NO_x$ when a stoichiometric amount of a gaseous oxidizing agent present in a lean combustion exhaust gas is larger than that of a gaseous reducing agent present in the lean combustion exhaust gas for reducing $NO_x$, while the adsorbed $NO_x$ is catalytically reduced in the presence of the reducing agent when a stoichiometric amount of the oxidizing agent is not larger that of the reducing agent in a stoichiometric or fuel rich combustion exhaust gas.

According to the present invention, an apparatus for purifying an exhaust gas from an internal combustion engine comprises an exhaust gas duct connected to the engine, through which the exhaust gas containing $NO_x$ gas passes, a device for controlling the air-fuel ratio of the exhaust gas, and a catalyst disposed in the exhaust gas duct so that it contacts with the exhaust gas. The air-fuel ratio is switched from a range in which the catalyst chemically adsorbs $NO_x$ in the lean combustion exhaust gas to a range in which adsorbed $NO_x$ is catalytically reduced in the presence of the reducing agent in a stoichiometric or fuel rich combustion exhaust gas.

The catalyst according to the present invention comprises a heat resistant carrier body and catalytic compounds supported thereon. The catalytic compounds comprise at least one of sodium and potassium, at least one of magnesium, strontium and calcium, and at least one of platinum, palladium and rhodium. In at least some embodiments, a base member supports the heat resistant carrier body.

According to the present invention, the reducing agent to be added to the lean combustion exhaust gas is at least one of gasoline, light oil, kerosene, natural gas, their reformed substances, hydrogen, alcohol, ammonia gas, engine blow-by gas and canister purging gas. The reducing agent is supplied to the lean combustion exhaust gas in response to signals from the stoichiometric establishing unit.

The exhaust gas purification apparatus according to the present invention further comprises a manifold catalyst which is disposed in the exhaust gas duct immediately after the engine, upstream of the catalyst, and functions as a three component catalyst and a combustion catalyst.

According to another feature of the present invention, in the exhaust gas purification apparatus, a second catalyst is disposed in the exhaust gas duct of a direct fuel injection engine.

According to yet another feature of the present invention, the exhaust gas purification apparatus further comprises a three component catalyst or a combustion catalyst is disposed in the exhaust gas duct upstream of the catalyst.

According to the present invention, an apparatus for purifying an exhaust gas from an internal combustion engine comprises an exhaust gas duct connected to the engine, through which the exhaust gas containing $NO_x$, $SO_x$ and oxygen passes, and a catalyst which chemically adsorbs $NO_x$ when the exhaust gas is emitted from lean combustion, and in which adsorbed $NO_x$ is catalytically reduced when a gaseous reducing agent is added to the lean combustion exhaust gas in such an amount that a stoichiometric amount of oxygen is not larger than that of the reducing agent.

The catalyst adsorbs or absorbs $SO_x$ in the lean condition, and releases SOX in the stoichiometric or rich condition.

According to the present invention, a catalyst for purifying an exhaust gas from an internal combustion engine comprises a base member, a heat resistant carrier body supported on the base member, and catalyst components supported on the carrier body. The carrier body has a number of small hollows extending in the direction of gas flow of the exhaust gas.

According to the present invention, the catalyst compounds comprise at least one alkali metal, at least one alkali earth metal (other than barium), at least one noble metal and at least one rare earth metal.

According to the present invention, an exhaust gas purification apparatus for use in an internal combustion engine comprises a catalyst which chemically adsorbs $NO_x$ when the amount of a gaseous oxidizing agent is greater than that of a gaseous reducing agent in a stoichiometric relation between the gaseous oxidizing agent and the gaseous reducing agent, and catalytically reduces adsorbed $NO_x$ when the gaseous reducing agent is equal to or exceeds the gaseous oxidizing agent. The catalyst is provided in an exhaust gas flow passage for a flow of an exhaust gas generated at a lean air-fuel ratio and at a rich air-fuel ratio or a stoichiometric air-fuel ratio.

According to the present invention, an exhaust gas purification apparatus for use in an internal combustion engine comprising a catalyst for chemically adsorbing $NO_x$ under a condition where an gaseous oxidizing agent is more than a gaseous reducing agent in a stoichiometric relation between the gaseous oxidizing agent and the gaseous reducing agent and a device which controls an air-fuel ratio to switch conditions between $NO_x$ chemical adsorption to the catalyst and catalytic reduction chemically of $NO_x$ to the catalyst.

According to the present invention, an exhaust gas purification apparatus comprises a catalyst which chemically adsorbs $NO_x$ when, in a stoichiometric relation between gaseous oxidizing agent and gaseous reducing agent in an exhaust gas flowing an exhaust gas flow passage in the internal combustion engine, the amount of gaseous oxidizing agent is more than the amount of gaseous reducing agent, and catalytic-reduces adsorbed $NO_x$ when the amount of gaseous oxidizing agent equals or exceeds the amount of gaseous reducing agent. The catalyst is provided in the exhaust gas flow passage where an exhaust gas burned at a lean air-fuel ratio and an exhaust gas burned at a rich or stoichiometric air-fuel ratio flow into alternately.

The exhaust gas purification apparatus according to the present invention provides a stoichiometric relation between oxidation and reduction of gaseous oxidizing agent and gaseous reducing agent. A control means for controlling the stoichiometric relation between gaseous oxidizing agents and gaseous reducing agents comprises a timing control means for controlling the time at which the stoichiometric relation between gaseous oxidizing agent and gaseous reducing agent changes over from a first condition in which the amount of gaseous oxidizing agent is more than that of a gaseous reducing agent, to another condition in which the amount of gaseous reducing agent is equal to or exceeds the amount of gaseous oxidizing agent. It also comprises a gaseous reducing agent excess time control means for controlling a time when, in the stoichiometric relation between oxidation and reduction, the gaseous reducing agent is held to an amount equal to or greater than the gaseous oxidizing agent.

According to the present invention, the catalyst has the ability to chemical adsorb $NO_x$, and to catalytic-reduce $NO_x$. Even when the oxygen concentration decreases, the catalyst does not discharge $NO_x$. These features can be obtained by a catalyst which comprises at least one element selected from among the alkali metals and alkali earth metals in the element periodic table (but not including barium (Ba)), and at least one selected from noble metals comprising platinum (Pt), palladium (Pd) and rhodium (Rh). Further, the catalyst has an ability for catalytic oxidizing HC or CO etc..

The catalyst has a high $NO_x$ absorption ability in a lean atmosphere and further under the catalyst temperature of 250–500° C. Further, to recover its $NO_x$ adsorbing ability by reduction of the absorbed $NO_x$, the catalyst must maintain a stoichiometric atmosphere or a rich atmosphere for a time of about 30 seconds or less.

Accordingly, to perform effectively $NO_x$ adsorption and to recover $NO_x$ adsorbing ability, it is desirable to provide the catalyst at a position of an exhaust gas duct where an inlet port gas temperature of the catalyst is 250–500° C. The above temperature range is one which can obtain normally under the car-body floor.

$NO_x$ adsorbing ability of the catalyst is lowered due to poisoning by $SO_x$ originated fuel (gasoline). However, when the catalyst is maintained several (for example, ten) minutes at 400–800° C. in a stoichiometric or rich atmosphere, $SO_x$ is removed and then $NO_x$ adsorbing ability is recovered.

Accordingly, when the gasoline quality is bad (high sulfur content) and the catalyst suffers from poisoning by $SO_x$, it is desirable to position the catalyst in an exhaust gas duct where an inlet port gas temperature of the catalyst is 400–800° C. The above temperature range is one which can obtain under the car-body floor.

When the catalyst is used for an automobile, it is desirable to form it as a honeycomb having $NO_x$ adsorption ability of more than 0.01 mol per an apparent honeycomb volume one (1) liter.

Further, it is desirable to set the specific surface area of the catalyst layer on the honeycomb substrate (the honeycomb base body), measured by absorbing nitrogen according to BET method, at more than 50 $m^2/g$.

In the exhaust gas, the gaseous oxidizing agents are $O_2$, NO, $NO_2$, etc. and are mainly oxygen. The gaseous reducing agents are HC supplied in an internal combustion engine, HC (including oxygen containing hydrocarbon) generated in a combusting process as a derivative from fuel, CO, $H_2$ etc. Furthermore, a reducing material such as HC can be added in the exhaust gas as a reducing component.

When the lean exhaust gas contacts the three component catalyst, HC, CO, $H_2$ etc. as the gaseous reducing agents for reducing $NO_x$ to nitrogen ($N_2$), cause a combustion reaction with oxygen ($O_2$) as the gaseous oxidizing agent in the exhaust gas. $NO_x$ (NO and $NO_2$) reacts with these gaseous reducing agents and is reduced to nitrogen ($N_2$). Normally, since both reactions proceed in parallel, a utilization rate of the gaseous reducing agents for reducing $NO_x$ is low.

Particularly at a high reaction temperature of more than 500° C. (depending on the catalyst material), an occupation rate of the latter reaction becomes large. Hence, by separating $NO_x$ from the exhaust gas (at least from $O_2$) using the catalyst, and then carrying out the catalytic-reaction with the gaseous reducing agents, it is possible to achieve an effective reduction of $NO_x$ to $N_2$. According to the present invention, the catalyst is used to adsorb and remove $NO_x$ in the lean exhaust gas, whereby $NO_x$ in the exhaust gas is separated from $O_2$.

Next, according to the present invention, with regard to the oxidation reduction relation, namely the stoichiometric relation between oxidation and reduction, which is constituted by the gaseous oxidizing agents ($O_2$ and $NO_x$ etc.) and the gaseous reducing agents (HC, CO, $H_2$ etc.) in the exhaust gas, the gaseous reducing agent is made equal to or larger than the gaseous oxidizing agent. In this manner $NO_x$ adsorbed on the catalyst is reduced to $N_2$ according to the catalytic-reaction with the gaseous reducing agent such as HC.

$NO_x$ in the exhaust gas is substantially constituted of NO and $NO_2$. The reaction property of $NO_2$ is rich in comparison with that of NO. Accordingly, when NO is oxidized to $NO_2$, the adsorption-removal and the reduction of $NO_x$ in the exhaust gas are performed easily.

The present invention includes a method of oxidizing and removing $NO_x$ in the exhaust gas to $NO_2$ by the coexistent $O_2$, and an oxidation means for attaining the above method (such as means having NO oxidation function and the means for providing an oxidation catalyst at a pre-stage of the catalyst).

The reduction reaction of a chemically adsorbed $NO_2$ according to the present invention will be described generally with following reaction formulas:

$$MO\text{---}NO_2 + HC \rightarrow MO + N_2 + CO_2 + H_2O$$
$$\rightarrow MCO_3 + N_2 + H_2O$$

where M indicates a metal element and $MO\text{---}NO_2$ indicates a combination State Of $NO_2$ of a metal oxide surface. A reason for employing $MCO_3$ as the reduction generation substance will be explained later.

The above reaction is exothermic. Alkali metals and alkali earth metals are used as the metal M, and the reaction heat is estimated by representing Na and Ba respectively as follows, under a standard condition (1 atmosphere, 25° C.):

$$2NaNO_3 \text{ (s)} + \tfrac{5}{9}C_3H_6 \text{ (g)} \rightarrow 2Na_2NO_3 \text{ (s)} + N_2 \text{ (g)} + \tfrac{2}{3}CO_2 \text{ (g)} + \tfrac{5}{3}CO_2 \text{ (g)} [-\Delta H=873 \text{ k joule}]$$

$$Ba(NO_3)_2 \text{ (s)} + \tfrac{5}{9}C_3H_6 \text{ (g)} \rightarrow BaCO_3 \text{ (s)} + N_2 \text{ (g)} + \tfrac{2}{3}CO_2 \text{ (g)} + \tfrac{5}{3}H_2O \text{ (g)} [-\Delta H=751 \text{ k joule}]$$

wherein, s indicates a solid state and g indicates a gaseous state. Here, a thermodynamic value of the solid state is used, as that of an adsorbed state.

It should be noted that the combustion heat of $\tfrac{5}{9}$ mole $C_3H_6$ is 1,070 k joule, and each of the above reactions is exothermic. The heat, which matches that for the combustion beat of HC, heat is transferred to the exhaust gas, and thus a local rise in temperature of a surface of the catalyst can be restrained.

Where the catching agent for $NO_x$ is an $NO_x$ absorbent, $NO_x$ which is taken into the mass of the absorbent is reduced. Heat transfer to the exhaust gas is limited, causing a rise in temperature of the absorbent. This exothermically generated heat shifts the balance of the absorption reaction to that of $NO_x$ discharging or $NO_x$ emission.

$$\text{absorption} \rightarrow MCO_3 \text{ (s)} + 2NO_2 + \tfrac{1}{2}O_2 \leftarrow \rightarrow M(NO_3)_2 + CO_2 \leftarrow \text{discharging}$$

Even though the concentration of the gaseous reducing agents is increased to reduce rapidly $NO_x$ concentration in the exhaust gas which is discharged to the outside of the absorbent, the reaction between $NO_2$ and HC in the gaseous phase does not proceed.

Accordingly, the amount of discharged $NO_x$ cannot be reduced fully by an increment of the gaseous reducing agents. Further, at a stage where the adsorption amount of $NO_x$ is small, a reduction operation may occur; however, since the regeneration frequency of $NO_x$ absorbent increases, it is not put to practical use.

The catalyst according to the present invention generates a small absolute amount of exothermic heat so as to catch $NO_x$ near its surface in accordance with chemical adsorption. Also the rise in temperature of the catalyst is small, so as to transfer heat rapidly to the exhaust gas. Accordingly, it is possible to prevent the discharge of $NO_x$ after it is captured.

The catalyst according to the present invention utilizes a material which catches $NO_x$ at or near its surface by chemical adsorption, and does not cause $NO_x$ discharging or $NO_x$ emission in accordance with the exothermic reaction during the reduction of $NO_x$.

Further, the catalyst according to the present invention adsorbs $NO_x$ contained in lean exhaust gas at its surface, and during the reduction of $NO_x$ it does not cause $NO_x$ discharge in accordance with the lowering of the oxygen concentration.

The inventors of the present invention have determined that the above stated features can be realized using a catalyst which is selected from at least one of alkali metals and alkali earth metals (classified in an element periodic table) and at least one of noble metals selected from platinum (Pt), rhodium (Rh) and palladium (Pd), but does not contain barium (Ba). Preferably, the catalyst according to the present invention includes at least one element selected from potassium (K), sodium (Na), and strontium (Sr), and noble metal elements.

In the exhaust gas purification apparatus according to the present invention, a catalyst arranged at an exhaust gas flow passage includes at least one element selected from potassium (K), sodium (Na), magnesium (Mg), strontium (Sr) and calcium (Ca), as well as noble metal elements.

In the exhaust gas purification apparatus, in the case of a stoichiometric relation between oxidation and reduction of each of the components included in the exhaust gas, the gaseous oxidizing agent is equal to or greater than the gaseous reducing agent, and $NO_x$ is chemically adsorbed on the catalyst. On the other hand, when the gaseous reducing agent is equal to or greater than the gaseous oxidizing agent, $NO_x$ which has been absorbed on the catalyst is reduced, according to the catalytic-reaction with the gaseous reducing agent, to harmless $N_2$.

The catalyst in the present invention can be applied suitably in particular by following substances.

The composition is constituted of a metal and a metal oxide substance (or a complex oxide substance) which contains at least one element selected from potassium (K), sodium (Na), magnesium (Mg), strontium (Sr) and calcium (Ca), at least one selected from rare earth metals, and at least one element selected from the noble metals including platinum (Pt), rhodium, (Rh), and palladium (Pd). This composition, which is supported on a porous heat-withstanding metal oxide substance, has a superior $NO_x$ adsorbing ability.

As the earth metal element, cerium (Ce) or lanthanum (La), particularly Ce, is preferable. The earth metal element has a function for exhibiting the three component function to the catalyst under the stoichiometric atmosphere or the rich atmosphere.

At least one of titanium (Ti) and silicon (Si) can be added to the catalyst according to the present invention, improving the heat resistant property and $SO_x$ endurance property of the catalyst. Ti or Si has a function for adsorbing or absorbing $SO_x$ under the lean atmosphere, or for discharging the adsorbed or absorbed $SO_x$ in a stoichiometric atmosphere or a rich atmosphere.

In the catalyst of the present invention, alkali metals, alkali earth metals, noble metals, rare earth elements, titanium (Ti) and silicon (Si) are held on the porous support or porous carrier member, which is supported or carried on a substance body. For the purpose of heat resistance, $\gamma\text{-}Al_2O_1$ is preferably employed as the porous support. As the substance body, a cordierite, mullite, a metal, for example, a stainless steel is preferable.

As the crystal structure of Ti which is held on the porous support, an amorphous oxide state is preferable. Further, in case where the catalyst includes Si and alkali earth metals at the same time, as both the crystal structures Si and alkali earth metals, an amorphous oxide state is preferable.

In the catalyst of the present invention, it is preferable to include in the porous support (porous carrier member), alkali metals of 5–20 wt %, and alkali earth metals of 3–40 wt %. Further, it is also preferable to include Pt of 0.5–3 wt %, Rh of 0.05–0.3 wt %, and Pd of 0.5–15 wt %, respectively. Mg prevents the cohesion or condensation of the active components which are held on the porous support, such as the noble metal.

It is also preferable to include the rare earth metals of 5–30 wt %, Ti of 0.1–30 wt %, and Si of 0.6–5 wt % as silica in the porous support.

The present invention provides a catalyst which comprises, on the porous support, sodium (Na), magnesium (Mg), and at least one element selected from platinum (Pt), palladium (Pd), and rhodium (Rh), as well as at least one selected from cerium (Ce) and lanthanum (La). Further, the porous support also preferably includes Na of 5–20 wt %, Mg of 1–40 wt % under a weight ratio Mg/(Na+Mg), Pt of 0.5–3 wt %, Rh of 0.05–0.3 wt %, and Pd of 0.5–15 wt % are included.

In the exhaust gas purification apparatus according to the present invention, to chemically adsorb $NO_x$ to the catalyst, or to catalytically reduce the chemically adsorbed $NO_x$, means must be provided for controlling the stoichiometric relation between oxidation and reduction by the gaseous oxidizing agents and the gaseous reducing agents in the exhaust gas. By providing a means for controlling the stoichiometric relation between oxidation and reduction, it is possible to assure that the gaseous reducing agent equals or exceeds the gaseous oxidizing agent. For example, the combustion condition in the internal combustion engine can be adjusted to a stoichiometric or a rich air-fuel ratio, or a gaseous reducing agent can be added to the lean burn exhaust gas.

One method of achieving the former is to control the fuel injection amount in accordance with the output of the oxygen concentration sensor and the output of the intake air flow amount sensor provided in the exhaust gas duct. In this method, some of the cylinders are operated with a rich mixture and the remainder are operated in a lean mixture. In the mixed components of the exhaust gas all of the cylinders the gaseous reducing agent is equal to or is greater than the gaseous oxidizing agent in the stoichiometric relation between the oxidation and the reduction.

The latter can be attained by each of following methods.

One method is to add a gaseous reducing agent to the exhaust gas flow upstream of the catalyst. As the gaseous reducing agent, gasoline, light gas oil, natural gas, reforming material thoseof, hydrogen, alcohol materials and ammonium materials can be applied. It is effective to introduce the blow-by gas and the canister purging gas at the upstream of the catalyst and to add the gaseous reducing agent such as hydrocarbon (HC) contained in the above materials. In an internal combustion engine with direct fuel injection, it is effective to inject the fuel during the exhausting process and to add the fuel as the gaseous reducing agent.

As the catalyst in the present invention, various shapes can be applied. In addition to a honeycomb shape which is obtained by coating the catalyst components onto a honeycomb shaped member comprised of cordierite or metal materials such as a stainless steel, a pellet shape, a plate shape, a particle shape and a powder shape can be applied.

In the present invention, the apparatus can provide means for establishing the time when the gaseous reducing agent is equal to or is greater than the gaseous oxidizing agent. The above timing is obtained by each of following methods.

In one technique, in accordance with the air-fuel ratio setting signal which is determined by ECU (engine control unit), the engine rotation number signal, the intake air amount signal, the intake air pipe pressure signal, the speed signal, the throttle valve opening degree signal, the exhaust temperature etc., the $NO_x$ discharging amount during lean operation is estimated and the integration value thereof is exceeds over a predetermined setting value.

In another method, in accordance with the signal of the oxygen sensor (or A/F sensor) arranged upstream or downstream of the catalyst in the exhaust gas flow passage, the accumulated oxygen amount is detected, and the accumulated oxygen amount exceeds over a predetermined amount. As a modified embodiment, the accumulated oxygen amount during the lean operation time exceeds a predetermined amount.

In another approach, in accordance with the signal of $NO_x$ sensor arranged at the upstream of the catalyst in the exhaust gas flow passage, the accumulated $NO_x$ amount is detected, and the accumulated $NO_x$ amount during the lean operation time exceeds over a predetermined amount.

In still another method, in accordance with the signal of $NO_x$ sensor arranged at the downstream of the catalyst in the exhaust gas flow passage, $NO_x$ concentration is detected, and $NO_x$ concentration exceeds over a predetermined concentration.

According to the present invention, further the apparatus provides the means for establishing the maintenance time where the gaseous reducing agent is equal to or exceeds the gaseous oxidizing agent. The time during which the gaseous reducing agent excess condition and the throw-in gaseous reducing agent amount is maintained can be determined taking into consideration the specifications and characteristics of the adsorbent and the internal combustion engine. The above methods can be realized by adjusting the stroke, the injection time and the injection interval of the fuel injector.

Other objects, advantages and novel features of the present invention will become apparent from the following detailed description of the invention when considered in conjunction with the accompanying drawings.

BRIEF DESCRIPTION OF DRAWINGS

FIG. 7 a block diagram showing a method for controlling an air-fuel ratio;

BEST MODE FOR CARRYING OUT THE INVENTION

Figure 1:
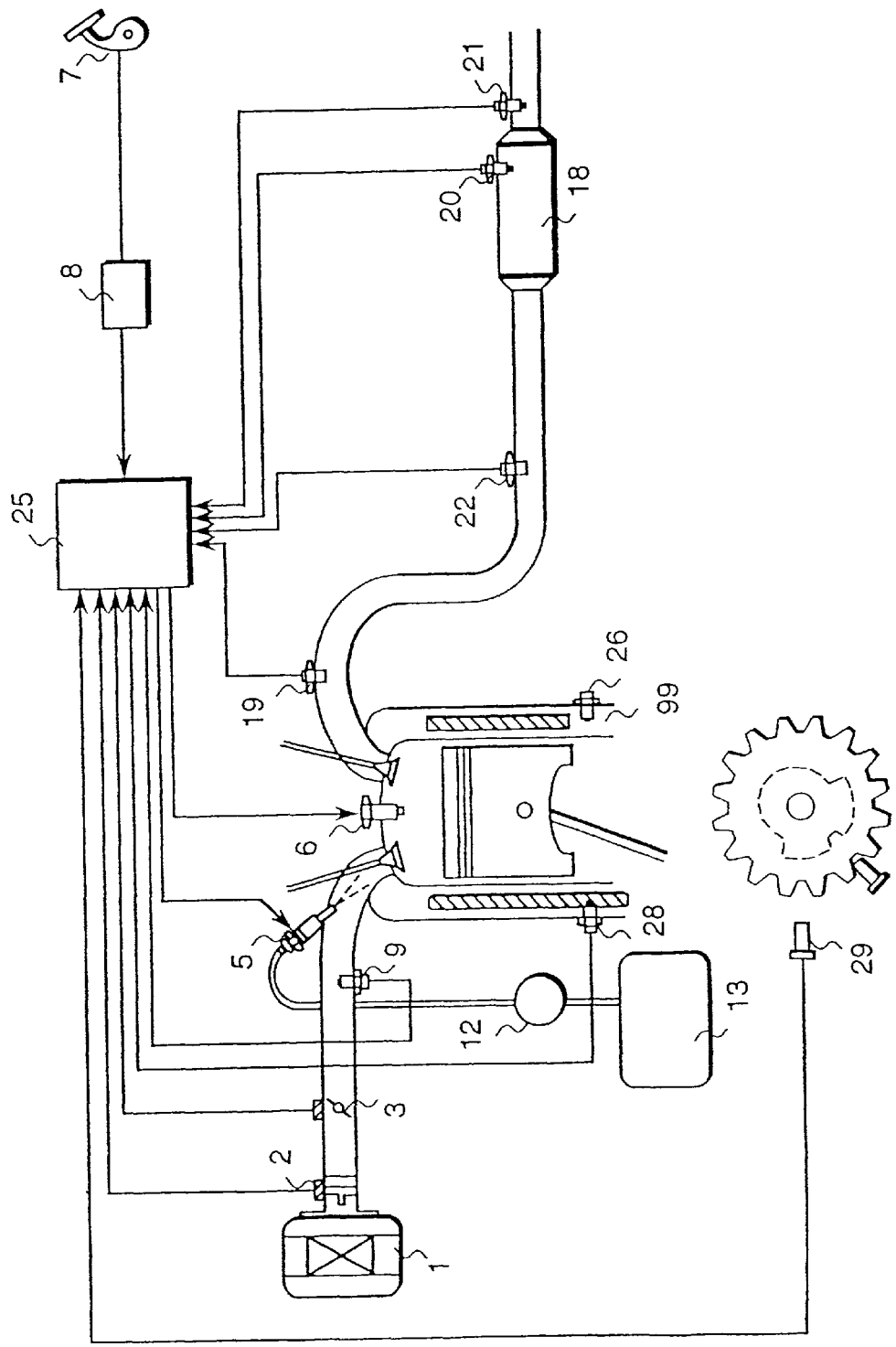
FIG. 1 is a schematic illustration of a representative embodiment of an exhaust gas purification apparatus for use in an internal combustion engine according to the present invention.

Hereinafter, one embodiment of an exhaust gas purification apparatus and an exhaust gas purification catalyst for use in an internal combustion engine according to the present invention will be explained. However, the present invention will not be limited within the following embodiments.

Characteristics and Representative Embodiments of Catalyst

The characteristics of a catalyst for use in an internal combustion engine in accordance with the present invention will now be explained.

(Catalyst Preparation Method)

A catalyst N-N9 was obtained according to a following method.

In a first embodiment, nitric acid alumina slurry was obtained by mixing alumina powders with alumina-sol obtained by peptizing boehmite by nitric acid. Then a cordierite honeycomb was immersed in the slurry and the cordierite honeycomb was pulled up rapidly. The slurry enclosed in a cell was removed by performing an air-blow process, and after drying of the honeycomb the honeycomb was calcined at 450° C.

The above processes was carried out repeatedly and alumina of 150 g per liter of an apparent volume of the honeycomb was coated.

On this alumina coated honeycomb catalyst active components were held and then a honeycomb shape catalyst was obtained.

In another example, the alumina coated honeycomb was immersed in a cerium nitrate ($Ce(NO_3)_2$) solution and the honeycomb was dried at 200° C. After drying, the honeycomb was calcined for 1 (one) hour at 600° C. In succession, it is immersed in a mixture liquid comprised of sodium nitrate ($NaNO_3$) solution, titania-sol solution and magnesium nitrate ($Mg(NO_3)_2$) solution. The honeycomb was then dried at 200° C. and calcined for 1 (one) hour at 600° C.

In still another example, the honeycomb was immersed in a solution comprised of dinitrodiamime Pt nitrate solution and rhodium nitrate ($Rh(NO_3)_2$) solution. The honeycomb was then dried at 200° C. the honeycomb, and calcined for 1 (one) hour at 450° C. Finally, it was immersed in a magnesium nitrate ($Mg(NO_3)_2$) solution, dried at 200° C., and calcined for 1 (one) hour at 450° C.

With the above process, a honeycomb shaped catalyst was obtained, in which Ce, Mg, Na, Ti, Rh and Pt were held on alumina ($Al_2O_3$) and is 2Mg-(0.2Rh, 2.7Pt)-(18Na, 4Ti, 2Mg)-27ce/$Al_2O_3$. Herein, /$Al_2O_3$ shows that the active component was held on $Al_2O_3$; the numerical value preceding the element is the weight (g) of the indicated metal component which was supported per 1 (one) liter of the apparent volume of the honeycomb.

An expressed order shows a support order or a carrier order and the elements were held in accordance with an order of the component for separating from the expressed component near to $Al_2O_3$, namely, on $Al_2O_3$, 27Ce, (18Na, 4Ti, 2Mg), (0.2Rh, 2.7Pt), and 2Mg are held in sequence, and the component bound up with parenthesis were supported at the same time. The amount of each of the respective active components which was deposited onto the carrier can be varied by varying the active component concentration in the immersed solution.

A catalyst N-K9 was prepared according to the following method.

In place of sodium nitrate ($NaNO_3$) solution used in the preparation for the catalyst N-N9, potassium nitrate ($KNO_3$) solution was used; otherwise a method was used which was similar to that for preparing the catalyst N-N9. As a result, a catalyst N-K9 comprised of 2Mg-(0.2Rh, 2.7Pt)-(18K, 4Ti, 2Mg)-27Ce/$Al_2O_3$, was obtained.

Further, with a similar method, a comparison catalyst N-R2 comprised of 2Mg-(0.2Rh, 2.7Pt)-27Ce/$Al_2O_3$ was obtained.

(Performance Evaluation Method)

After the catalysts obtained by the above stated methods were thermally treated at 700° C. under an oxidizing atmosphere for 5 (five) hours, the characteristics were evaluated using the following methods.

On an automobile in which a lean burn gasoline engine was mounted having the displacement volume of 1.8 liters, the honeycomb shape catalysts having a volume of 1.7 liters prepared using the above stated methods were mounted, and the $NO_x$ purification characteristics were evaluated.

(Characteristics of Catalysts)

Figure 2:
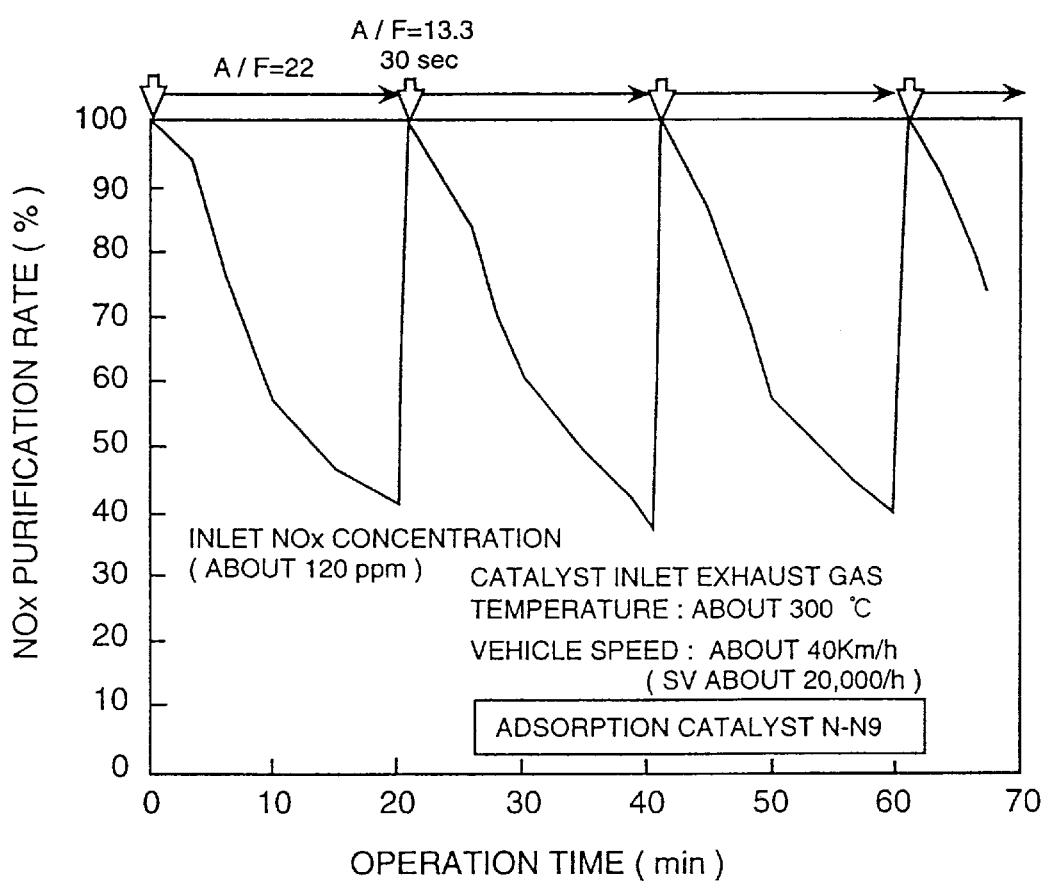
FIG. 2 is a time lapse characteristic of $NO_x$ purification rate where a rich operation and a lean operation are repeated alternately in accordance with a method for purifying an exhaust gas of an internal combustion engine according to the present invention.

When the catalyst N-N9 was mounted, and a 30 second period of rich operation (having A/F=13.3) and an about 20 minutes period of a lean operation (having A/F=22) were repeated alternately, the $NO_x$ purification characteristics shown in FIG. 2 were obtained.

When the fuel is gasoline, a mass composition of the gasoline comprises carbon (C) of about 85.7% and hydrogen (H) of about 14.3%. Herein, when the gasoline of F (g) is burned, carbon (C) of 0.857×F (g) reacts with oxygen ($O_2$)

of 0.857F/12 mol and hydrogen (H) of 0.143×F (g) reacts with oxygen ($O_2$) of 0.143F/4 mol. A necessary air amount A (g) is expressed as following:

$$A = ((0.857/12 + 0.143/4) F \times 28.8)/0.21 = 14.7 F$$

wherein, 28.8 is air molecular amount (g/mol) and 0.21 is oxygen ($O_2$) amount rate in air.

A/F=14.7 indicates a stoichiometric air-fuel ratio.

Accordingly, when A/F=13.3, to the fuel (a gaseous reducing agent) of F (g), it shows an insufficient amount (a reduction atmosphere) of the air (the gaseous oxidizing agent) of 1.39F (g). On the other hand in case of A/F=22, to the fuel of F (g), it shows an excess (an oxidization atmosphere) of the air (the gaseous oxidizing agent) of 7.31F (g).

As shown in FIG. 2, $NO_x$ during the lean operation time was purified in accordance with this catalyst.

The $NO_x$ purification rate during lean operation decreased gradually; that is, the initial purification rate of 100% decreased to about 40% after 20 minutes. However, the reduced purification rate recovered to 100% after 30 seconds of rich operation. When lean operation was carried out again, $NO_x$ purification performance was recovered and the above stated change in time lapse was repeated.

Even when the lean operation and the rich operation were repeated in plural times, the velocity of the lowering in time lapse of $NO_x$ purification rate during the lean operation was unchanging. Thus, the $NO_x$ absorption performance was fully regenerated according to the rich operation.

Figure 3:
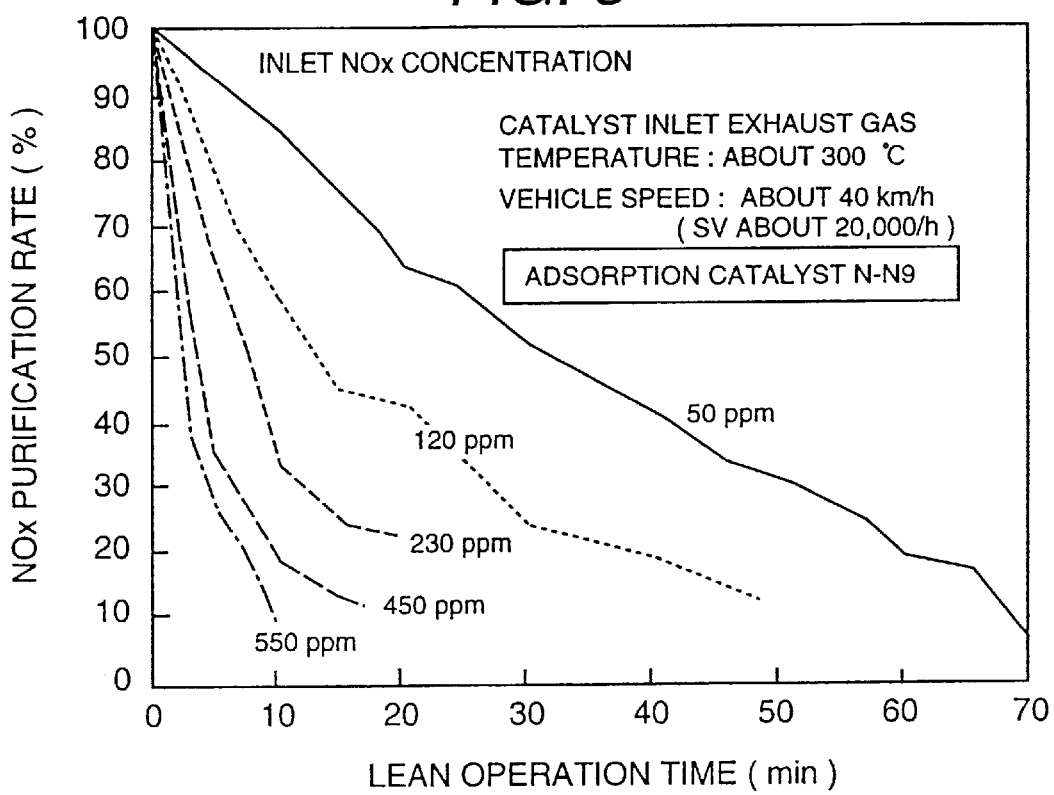
FIG. 3 shows the relationship between $NO_x$ concentration and $NO_x$ purification rate in a lean exhaust gas.

The vehicle speed was constant at about 40 km/h (the exhaust gas space velocity (SV) was constant at about 20,000/h) and $NO_x$ concentration in the exhaust gas was varied by varying the ignition periods. The relationship between $NO_x$ concentration and $NO_x$ purification rate in the lean exhaust gas was determined, and is shown in FIG. 3.

$NO_x$ purification rate decreased with time; however, the more $NO_x$ concentration lowered, the lower the rate of decrease. The amount of $NO_x$ that was removed prior to $NO_x$ purification rates of 50% and 30% was estimated through FIG. 3, and is shown in Table 1.

TABLE 1

| $NO_x$ concentration in inlet port exhaust gas (ppm) | $NO_x$ amount purified until purification rate 50% (mol) | $NO_x$ amount purified until purification rate 30% (mol) |
| --- | --- | --- |
| about 50 | 0.030 | 0.041 |
| about 120 | 0.031 | 0.047 |
| about 230 | 0.030 | 0.045 |
| about 450 | 0.030 | 0.042 |
| about 550 | 0.026 | 0.038 |

$NO_x$ amounts which were caught were substantially constant, regardless of $NO_x$ concentration. The absorption amount did not depend to the concentration (pressure) of the adsorbent, which is a feature of the chemical adsorption.

In the test catalysts, first Pt particles were used as an $NO_x$ absorption medium. A CO adsorption amount evaluation which is frequently used as means for evaluating the exposed Pt amount was carried out; and CO adsorption amount (at 100° C.) was found to be $4.5 \times 10^{-4}$ mol. This value was about 1/100 of the above stated $NO_x$ adsorption amount; and therefore it was clear that Pt does not work as a main role for $NO_x$ adsorbent.

On the other hand, BET surface area (measured by nitrogen adsorption) of this catalyst (including cordierite as a substrate) was measured about 25 m²/g and was 28,050 m² per the honeycomb 1.7 liters. Further, the chemical structure of the Na contained in the catalyst according to the present invention was studied. From the facts that $CO_2$ gas was generated and dissolved in an inorganic acid, and from a value of a point of inflection in a pH neutralization titration curve line, it was determined that Na existed mainly as $Na_2CO_3$.

Supposing all of the surface was occupied by $Na_2CO_3$, $Na_2CO_3$ of 0.275 mol would be exposed on the surface. (As the specific gravity of $Na_2CO_3$ is 2.533 g/mol, the volume of one molecular of $Na_2CO_3$ can be estimated. Supposing $Na_2CO_3$ is a cube, an area of one face of $Na_2CO_3$ was estimated and the estimated area was used as the occupation area of the surface $Na_2CO_3$).

In accordance with the above stated reaction formula, $Na_2CO_3$ of 2.75 mol has an ability to adsorb $NO_2$ of 0.55 mol. However, the amount of $NO_x$ which had been removed by the catalyst according to the present invention is on the order of 0.04 mol, which is less than 1/10 of the ability.

The above difference attributed the cause that BET method evaluated the physical surface area and the surface area of $Al_2O_3$ with the surface area of $Na_2CO_3$ was evaluated.

The above stated evaluations show the adsorbed $NO_x$ amount was far greater than the $NO_x$ catching power of $Na_2CO_3$ bulk, and at least $NO_x$ was caught at a limited area of the surface or the vicinity of the surface of $Na_2CO_3$.

Further, in FIG. 3, the rate of decrease of the purification rate lowered at about $NO_x$ purification rate of 20%, however this shows that the reducing reaction caused according to the catalyst function.

Figure 4:
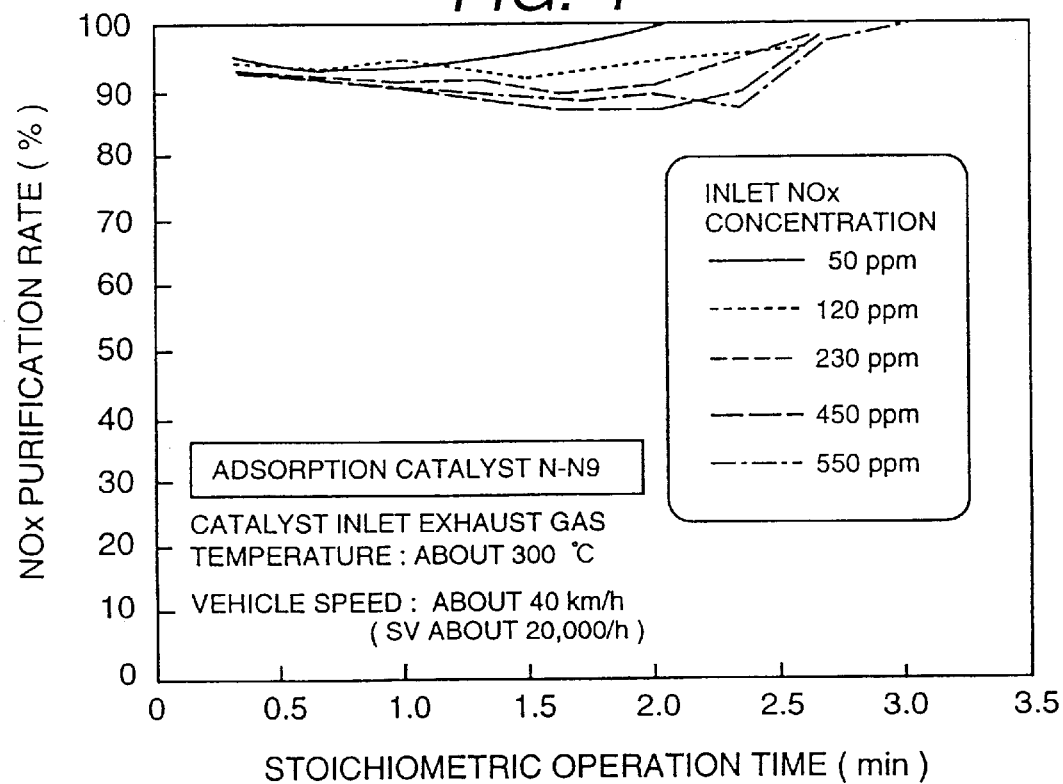
FIG. 4 is $NO_x$ purification rate in a stoichiometric exhaust gas.

FIG. 4 shows the $NO_x$ purification rate immediately after the lean operation has changed over to stoichiometric operation.

Figure 5A:
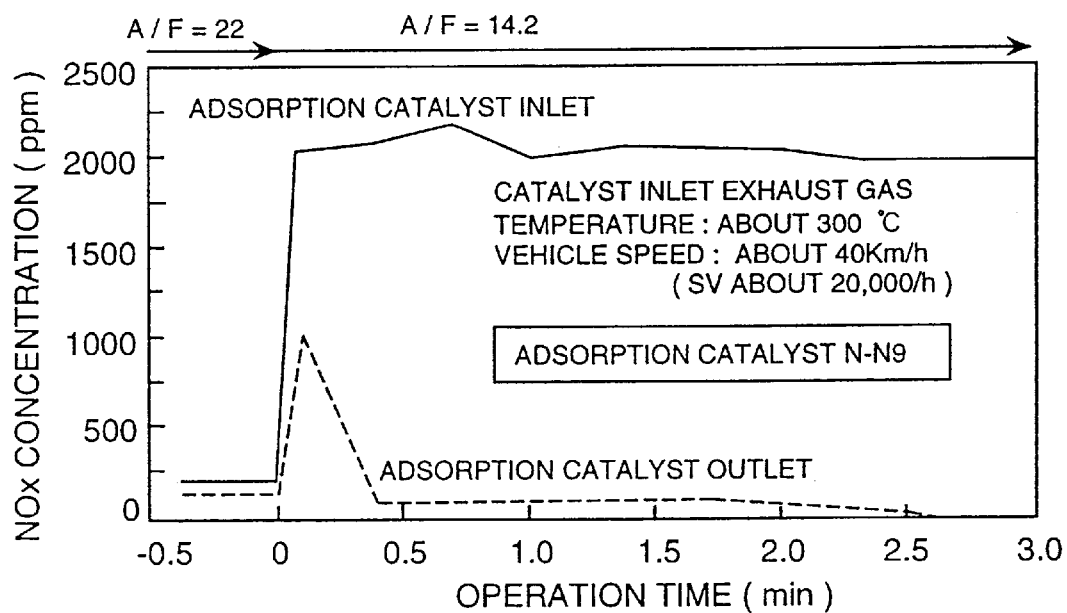
FIGS. 5A and 5B show the relationships between an inlet port $NO_x$ purification rate and an outlet port $NO_x$ purification rate of a catalyst when a rich (stoichiometric) operation is changed over to a lean operation.
Figure 5B:
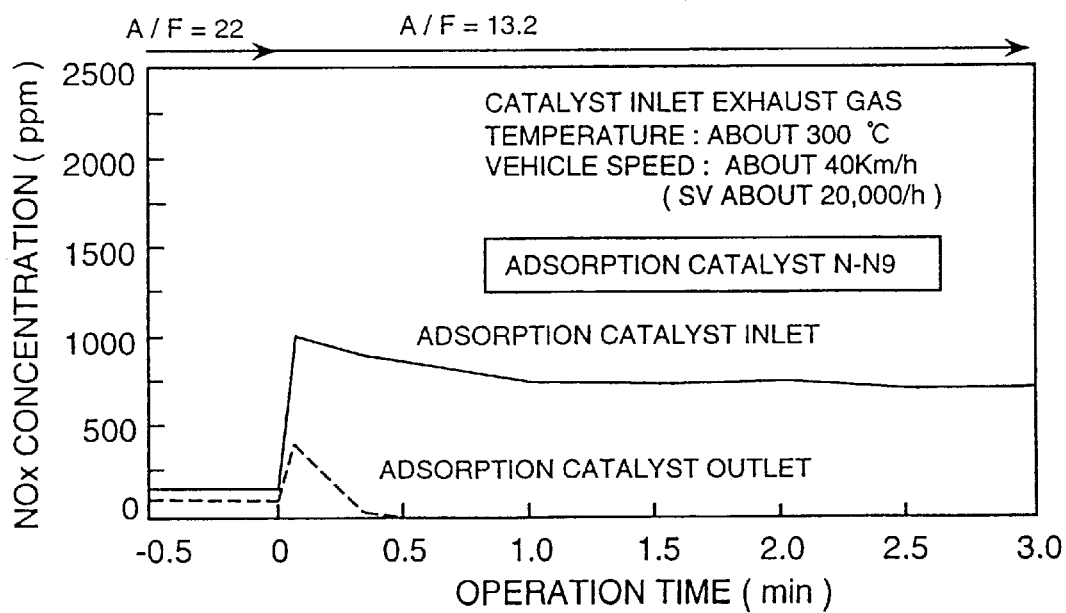
Figure 6A:
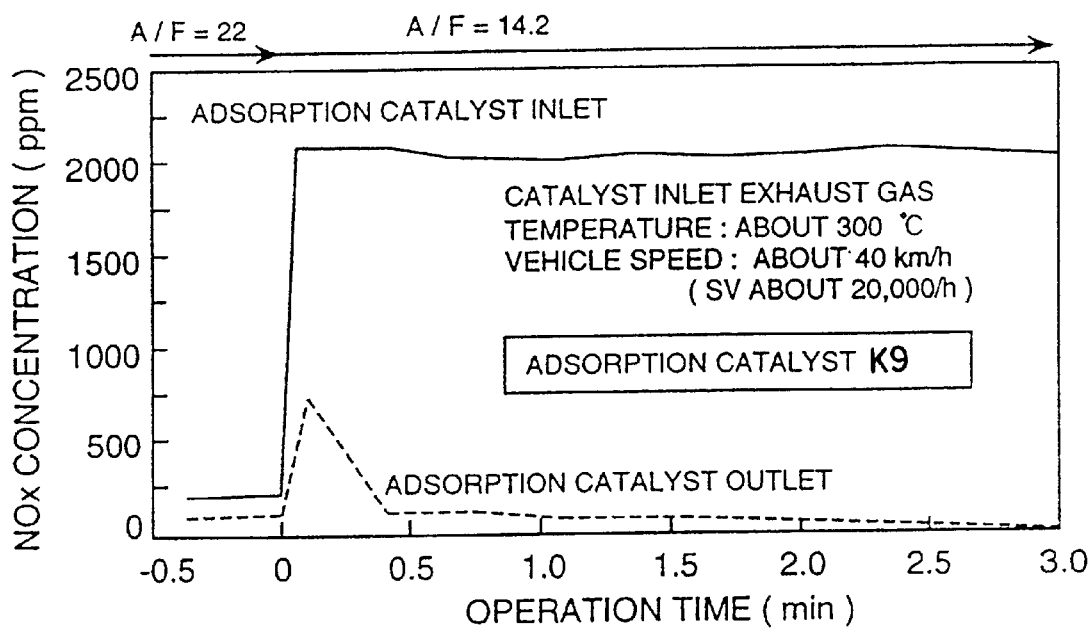
FIGS. 6A and 6B shows the relationships between an inlet port $NO_x$ purification rate and an outlet port $NO_x$ purification rate of a catalyst when a rich (stoichiometric) operation is changed over to a lean operation.
Figure 6B:
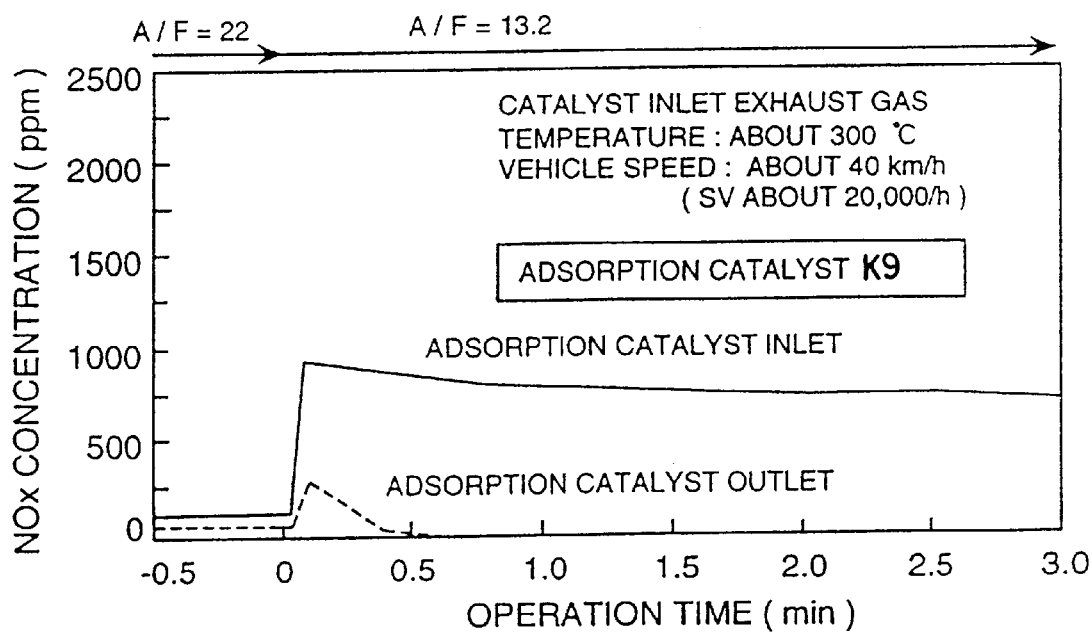

FIGS. 5A and 6A show the $NO_x$ purification characteristic when the lean operation has changed over to the stoichiometric operation; and FIGS. 5B and 6B show the $NO_x$ purification characteristic when the lean operation has changed over to rich operation.

FIGS. 5A and 5B shows $NO_x$ concentrations of an inlet port and an outlet port of the catalyst N-N9. FIG. 5A shows the case where the air-fuel ratio is changed from lean operation at A/F=22 to stoichiometric operation at A/F=14.2. At A/F=14.2, to the fuel of F (g), it shows a shortage of air (the gaseous oxidizing agent) of 0.5 F (g); That is, a reduction atmosphere.

Regeneration starts immediately after the stoichiometric change-over. Since the exhaust gas $NO_x$ concentration in the exhaust gas of A/F=14.2 is high at that time, the inlet port $NO_x$ concentration in the stoichiometric operation increases substantially, and at the same time the outlet $NO_x$ concentration increases in a transient manner. However, the outlet port $NO_x$ concentration is always substantially lower than the inlet port $NO_x$ concentration. The regeneration proceeds rapidly, and the outlet port $NO_x$ concentration approaches zero (0) within a short time.

FIG. 5B shows case where the air-fuel ratio is changed over from lean operation at A/F=22 to rich operation at A/F=13.2. Similarly to FIG. 5A, the outlet port $NO_x$ concentration is always much lower than the inlet port $NO_x$ concentration. Further, the outlet port $NO_x$ concentration reaches the vicinity of zero (0) within a shorter time.

As clearly understood from the above, the A/F value during regeneration affects the time required for regeneration. A/F value, the time and gaseous reducing agent amount suitable for the regeneration are influenced by the composition (such as the shape, temperature and SV value) of the catalyst, the kind of the gaseous reducing agent, and the shape and the length of the exhaust gas flow passage. Accordingly, the regeneration condition is determined overall by all of the above stated items.

FIGS. 6A and 6B show $NO_x$ concentrations of an inlet port and an outlet port of the catalyst N-K9. FIG. 6A shows case where the air-fuel ratio is changed from lean operation (A/F=22) to stoichiometric operation (A/F=14.2), and FIG. 6B shows case where the air-fuel ratio is changed over from lean operation at A/F 22 to rich operation at A/F=13.2.

Similarly to case of the above catalyst N-N9, the outlet port $NO_x$ concentration is always much less than the inlet port $NO_x$ concentration, further the regeneration of the catalyst proceeds within a short time.

(Basic Characteristics of Catalyst)

Using a model gas, the basic characteristics (in particular, the effect of oxygen concentration on the $NO_x$ purification rate) were evaluated.

The cordierite honeycomb of the catalyst N-N9 having 6 ml was filled up in a silica reaction tube having an inner diameter of 28 mm and the model gas was passed through the tube. The oxygen concentration in the model gas was varied, and the effect on the $NO_x$ purification rate was studied. The reaction temperature was 300° C. at the inlet port gas temperature of the catalyst.

Initially, the gas composition comprises of $O_2$ of 5% (volume ratio: same hereinafter), NO of 600 ppm, $C_3H_4$ of 500 ppm (1,500 ppm as $C_1$), CO of 1,000 ppm, $CO_2$ of 10%, $H_2O$ of 10%, and the balance of $N_2$. After ten (10) minutes, when $NO_x$ purification rate has been stable, the oxygen concentration was lowered to a predetermined value and maintained for twenty (20) minutes. Finally, the gas mixture was then returned again to its initial composition. $NO_x$ concentration change for the above time interval was varied with six different $O_2$ concentrations, (0%, 0.5%, 0.7%, 1%, 2% and 3%), and the graphs shown in FIG. 19 was obtained.

Figure 19:
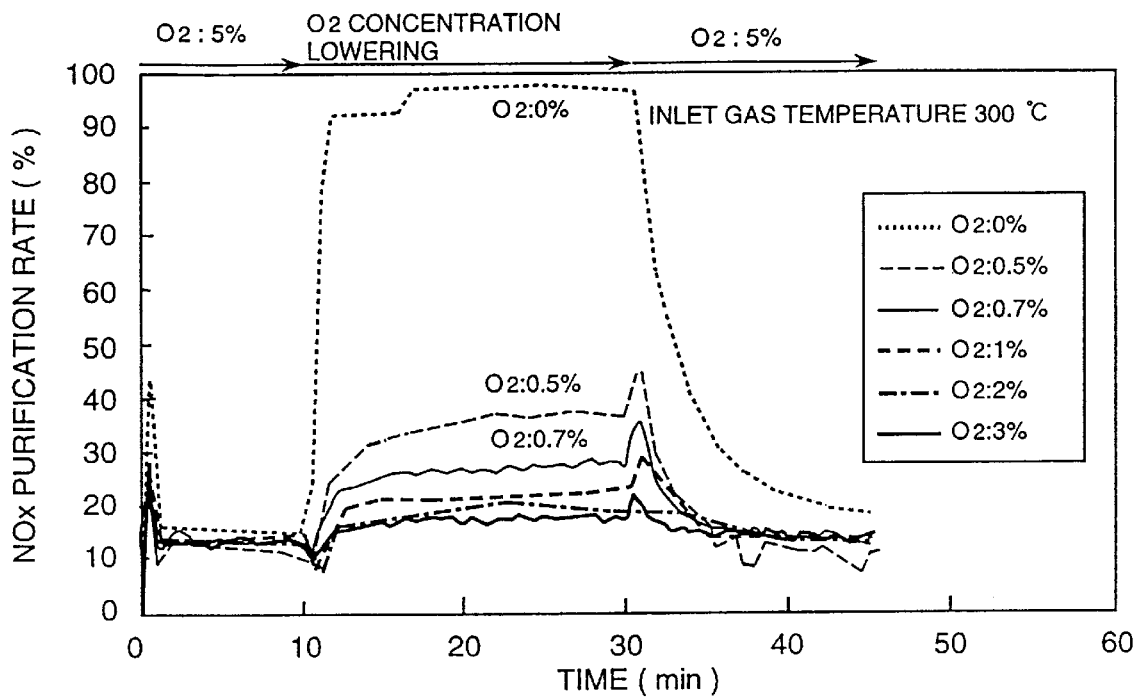
FIG. 19 is a graph showing an $NO_x$ purification characteristic where an oxygen concentration is varied using a model gas.

FIG. 19 shows that when the oxygen concentration in the lean gas was decreased (that is, the oxidization atmosphere became weak and the reduction atmosphere became strong), it was admitted that $NO_x$ purification rate tended to increase. This suggests that this catalyst purifies $NO_x$ by way of reduction.

Further, in FIG. 19, the $NO_x$ purification rate was positive at all times, and accordingly, the catalyst $NO_x$ concentration passed through the catalyst did not increase, regardless of the oxygen concentration.

Figure 20:
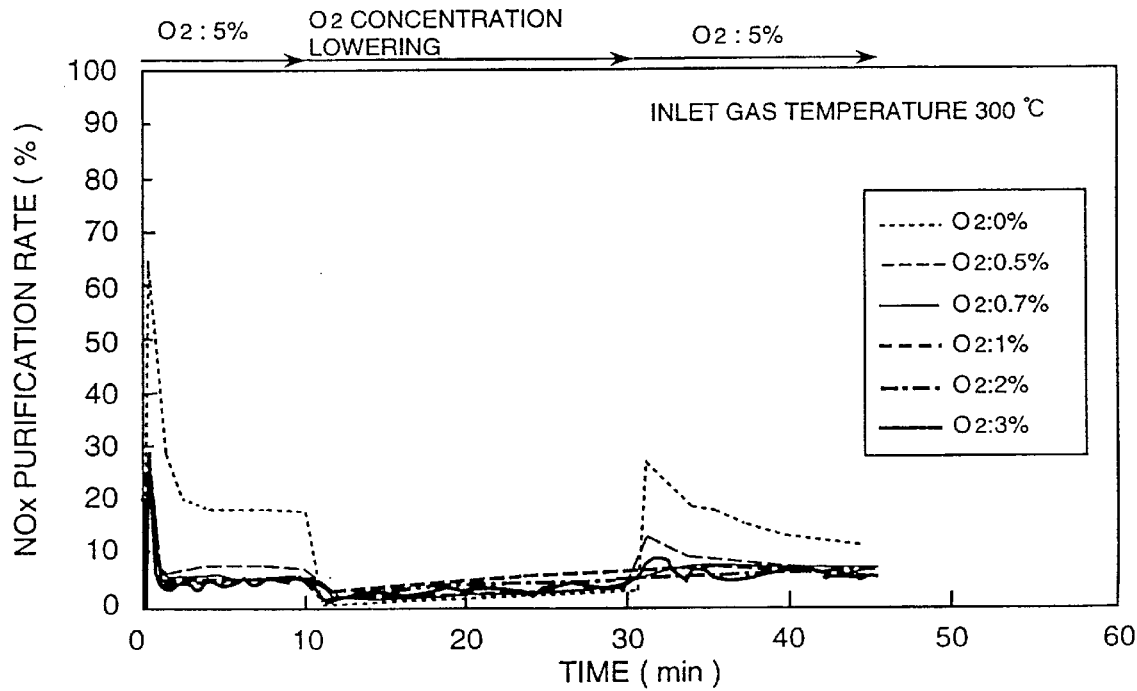
FIG. 20 is a graph showing an $NO_x$ purification characteristic where an oxygen concentration is varied using a model gas.

Next, a gas comprising $O_2$ of 5%, NO of 600 ppm, and the balance of $N_2$ was used, and the oxygen concentration was similarly varied. FIG. 20 shows the results. In this examination, the gaseous reducing agent was not included in the gas. In FIG. 20, by lowering the oxygen concentration and even the oxidization atmosphere was weakened, then $NO_x$ purification rate did not improve. This suggests that this catalyst purifies $NO_x$ by reduction.

In FIG. 20, the $NO_x$ purification rate did not have a positive value. Further in this catalyst according to the oxidization atmosphere caught $NO_x$ is not discharged or emitted.

An Exhaust Gas Purification Apparatus

FIG. 1 shows one embodiment of an exhaust gas purification apparatus according to the present invention, which comprises an air intake system having an engine 99 which is suitable for lean burn operation, an air flow sensor 2, a throttle valve 3 etc. The exhaust system has an oxygen concentration sensor 19 (or A/F sensor), an exhaust gas temperature sensor 17 and a catalyst 18 etc., and an engine control unit (ECU) etc..

ECU comprises an I/O LSI as an input/output interface, an execution processing unit MPU, memory units (RAM and ROM) for storing many control programs, and a timer counter, etc.

The above stated exhaust gas purification apparatus functions as follows. After the intake air to the engine 99 is filtered through an air cleaner 1, it is metered by the air flow sensor 2. Further, the air passes through the throttle valve 3, is received for fuel injection through an injector 5, and supplied to the engine 99 as an air-fuel mixture. The signals of the air flow sensor 2 and others are inputted into ECU (engine control unit).

In the ECU, by the latter stated method the operation conditions of the internal combustion engine and of the catalyst are evaluated, and an air-fuel ratio is determined. By controlling the injection period etc. of the injector 5, the fuel concentration of the air-fuel mixture is established at a predetermined value.

The air-fuel mixture sucked into the cylinders is ignited and burned by means of an ignition plug 6, which is controlled according to signals from ECU. The combustion exhaust gas is led to an exhaust gas purification system, which includes a catalyst 18. During stoichiometric operation $NO_x$, HC and CO are purified according to the three component catalyst function. During lean operation $NO_x$ is purified by adsorption and at the same time HC and CO are purified by combustion.

Further, in accordance with the judgment and the control signal of the ECU, the $NO_x$ purification ability of the catalyst 18 is monitored continuously during lean operation, and when its $NO_x$ purification capacity lowers, the air-fuel ratio etc. is shifted to the rich side, so that the $NO_x$ purifying ability is recovered. With the above stated operation, in this apparatus, the exhaust gas is purified effectively under all engine combustion conditions, including lean operation and stoichiometric operation (including rich operation).

The fuel concentration (the air-fuel ratio) of the air-fuel mixture supplied to the engine is controlled as shown in the block diagram of FIG. 7.

Based on signals from an accelerator pedal depression sensor, an intake air amount metered by the air flow sensor 2, an engine rotational speed detected by a crank angle sensor, a throttle sensor signal for detecting the throttle valve opening, an engine water coolant temperature signal, a starter signal etc., ECU 25 determines the air-fuel ratio (A/F), and this signal is compensated according to a signal which is fed-back from the oxygen sensor.

In cases of low temperature, an idling time and a high load time etc., the above feed-back control according to the signal of the respective sensor and the respective switching means is stopped. Further, the apparatus has an air-fuel ratio compensation leaning function which enables the apparatus to adapt accurately to both delicate and abrupt changes of the air-fuel ratio.

When the determined air-fuel ratio is stoichiometric (A/F=14.7) or rich (A/F<14.7), the injection conditions for the injector 5 are determined by the ECU, and thereby the stoichiometric operation and the rich operation are carried out.

On the other hand, when lean operation (A/F>14.7) is detected, the $NO_x$ adsorbing ability of the catalyst 18 is evaluated. When it is judged that the apparatus has adsorbing ability, the fuel injection amount for carrying out lean operation is determined. When, however, it is judged that the apparatus has no adsorbing ability, the air-fuel ratio is shifted to the rich side for a predetermined period, and the catalyst 18 is regenerated.

Figure 8:
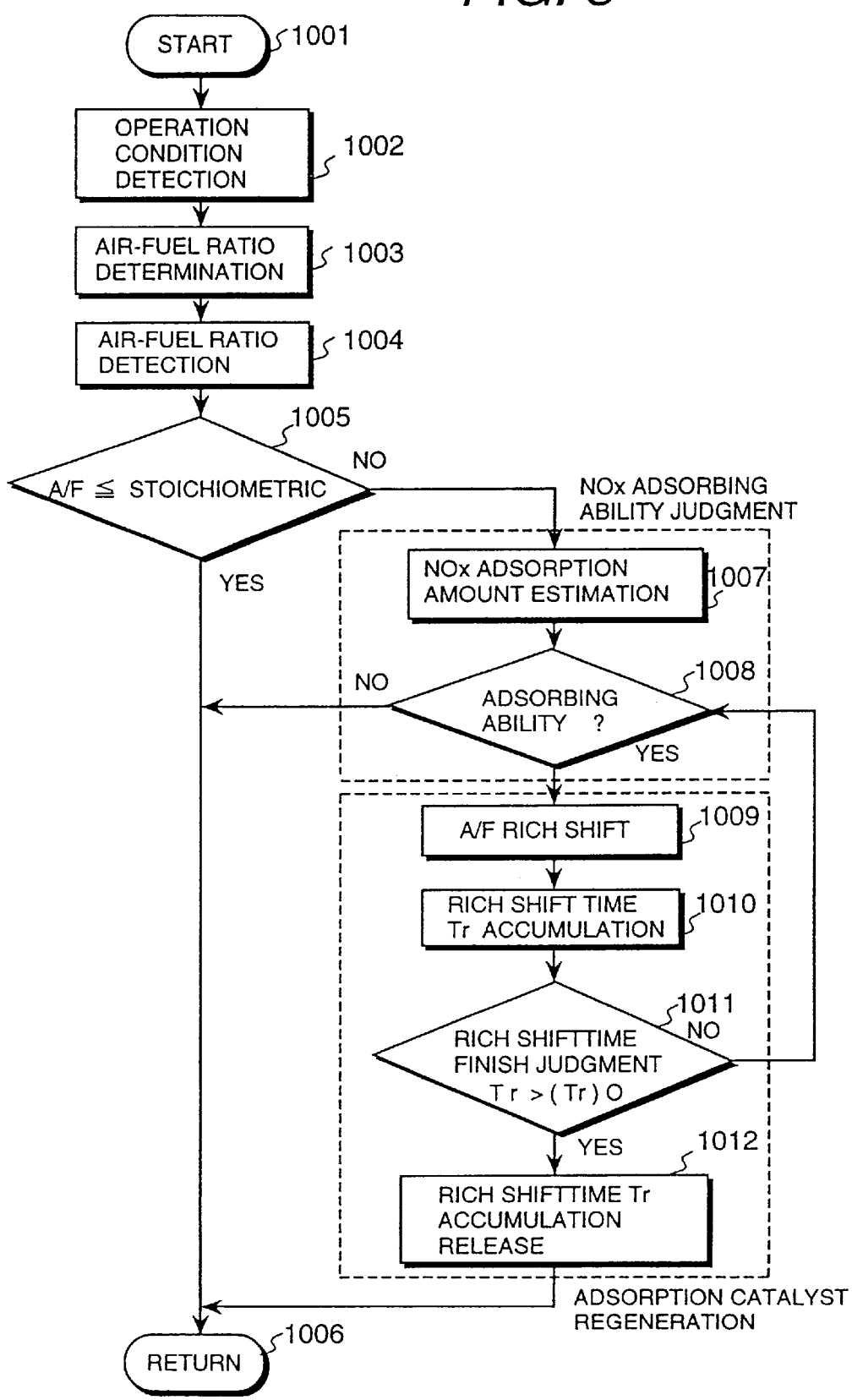
FIG. 8 is a flow chart showing a method for controlling an air-fuel ratio.

FIG. 8 shows a flow chart of the air-fuel ratio control. In step 1002, signals indicating various operation conditions are read in. Based on these signals, in step 1003, the air-fuel ratio is determined, and in step 1004 the determined air-fuel ration is detected. In step 1005, the determined air-fuel ratio is compared to the stoichiometric air-fuel ratio.

The stoichiometric air-fuel ratio used for this comparison, to put it more precisely, is the air-fuel ratio in which the velocity of the catalytic reduction reaction of $NO_x$ in the catalyst exceeds the $NO_x$ pick-up velocity in accordance with the adsorption. This stoichiometric air-fuel ratio is determined by evaluating the characteristics of the catalyst in advance, and the air-fuel ratio of the vicinity of the stoichiometric air-fuel ratio is selected.

Herein, when the established air-fuel ratio is equal to or less than the stoichiometric air-fuel ratio, processing advances to step 1006, and without regeneration operation of the catalyst the air-fuel ratio operation followed by the indication is carried out.

If the established air-fuel ratio is greater than the stoichiometric air-fuel ratio, the $NO_x$ adsorption amount is estimated in step 1007, and in step 1008, the estimated amount is compared with a predetermined limitation amount.

The limitation adsorption amount is set to a value which permits $NO_x$ in the exhaust gas to be fully purified, based on experimentally determined $NO_x$ removal characteristics of the catalyst, taking into account the exhaust gas temperature and the catalyst temperature etc..

If the apparatus retains $NO_x$ adsorbing ability, processing advances to step 1006, without the regeneration of the catalyst the air-fuel ratio operation followed by the indication is carried out. If, however, the apparatus has no $NO_x$ adsorbing ability, processing goes to step 1009, and the air-fuel ratio is shifted to the rich side. In step 1010, the rich shift time is counted, and when the elapsed time Tr exceeds a predetermined time $(Tr)_c$, the rich shift finishes.

The evaluation of $NO_x$ adsorbing ability of the catalyst will be carried out as following.

Figure 9:
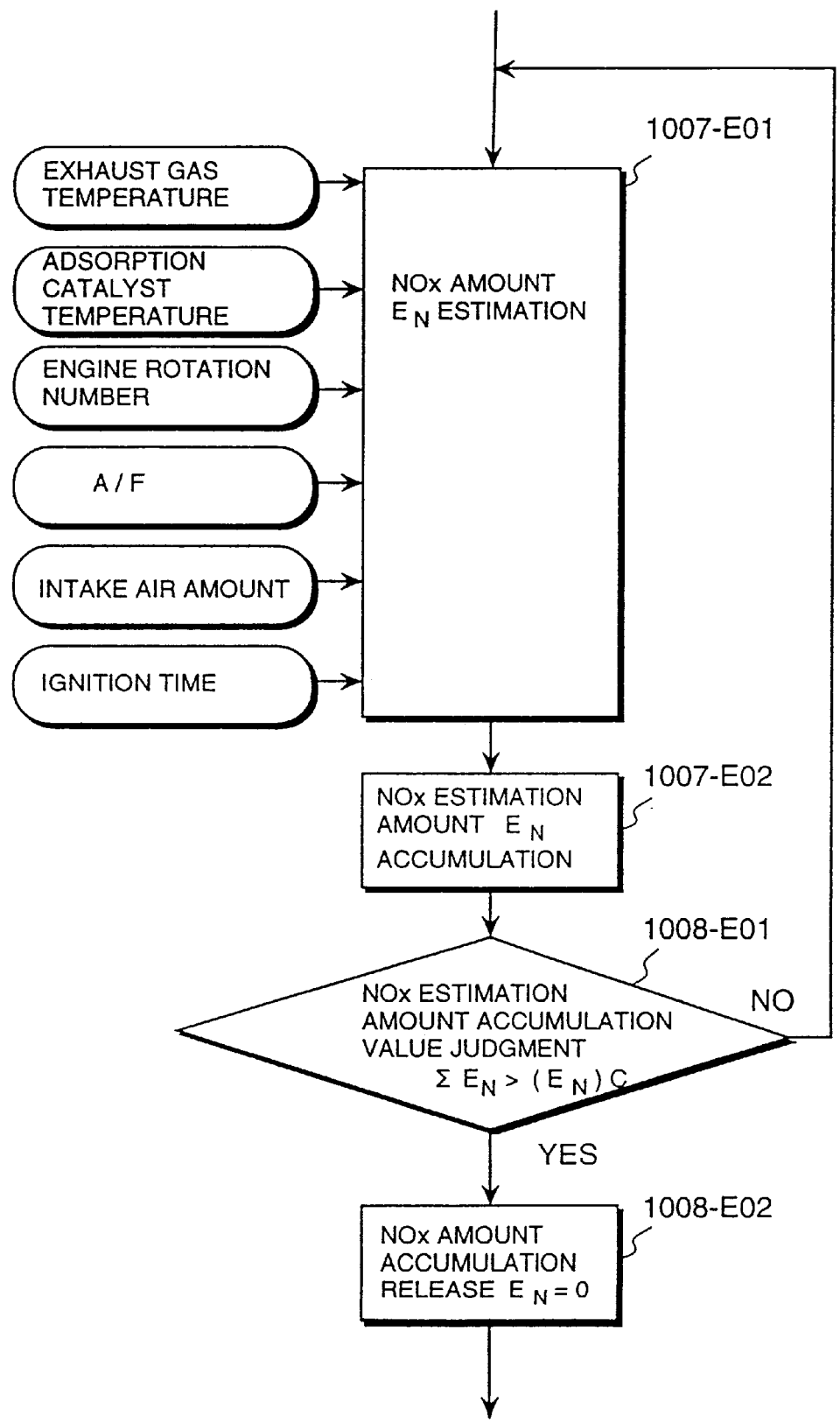
FIG. 9 is a flow chart showing a method for accumulating $NO_x$ discharging amount during a lean operation.

FIG. 9 shows a method for judging and accumulating the $NO_x$ discharge amount according to the various kinds operation conditions during the lean operation time.

In step 1007-EO1, the signals relating to the working conditions of the catalyst such as the exhaust gas temperature and various kinds of engine operation conditions which affect to $NO_x$ concentration in the exhaust gas are read in, and $NO_x$ amount $E_n$ that is adsorbed in a unit time is estimated.

In step 1007-EO2, $NO_x$ amount $E_n$ is accumulated, and in step 1008-EO1 the accumulated value $\Sigma E_n$ is compared with the upper limitation value $(E_n)$.

When the accumulated value $\Sigma E_n$ is equal to or is less than the upper limitation value $(E_n)_c$, the accumulation is continued; but if the accumulated value $\Sigma E_n$ exceeds the upper limitation value $(E_n)_c$ the accumulation is released in step 1008-EO2 and the process advances to step 1009.

Figure 10:
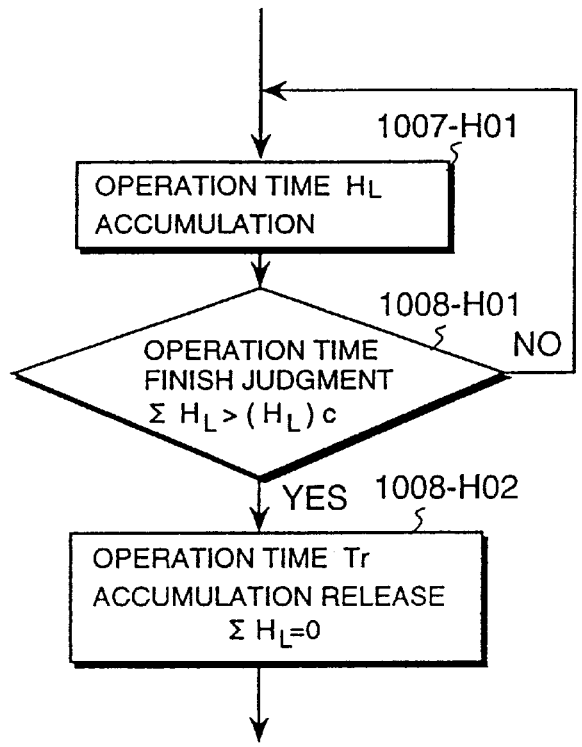
FIG. 10 is a flow chart showing $NO_x$ amount assumption in the flow chart shown in FIG. 8.

FIG. 10 shows a method for evaluating the $NO_x$ adsorbing ability of the catalyst according to the accumulated lean operation time.

In step 1007-HO1, the lean operation time is accumulated, and in step 1008-HO1 the value $\Sigma H_L$ is compared with an upper limitation value $(HL)_c$.

When the accumulated value $\Sigma H_L$ is equal to or is less than the upper limitation value $(H_L)_c$ accumulation is continued; however, when the accumulation value $\Sigma H_L$ exceeds the upper limitation value $(H_L)_c$ the accumulation is released in step 1008-HO2, and processing goes to step 1009.

Figure 11:
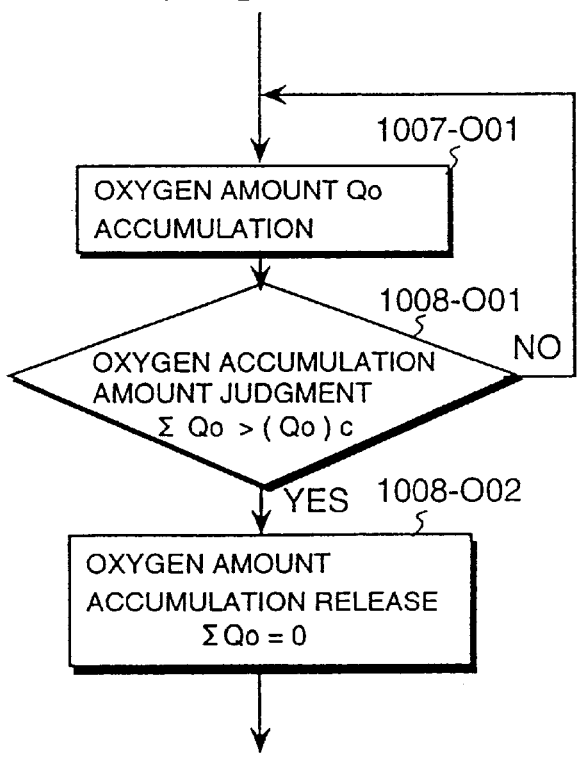
FIG. 11 is a flow chart showing $NO_x$ amount assumption in the flow chart shown in FIG. 8.

FIG. 11 shows a method for evaluating the $NO_x$ adsorbing ability of the catalyst according to the oxygen sensor signal during the lean operation time.

In step 1007-001, the oxygen amount $Q_o$ is accumulated, and in step 1008-001 the accumulated value $\Sigma Q_o$ is compared with an upper limitation value $(Q_o)_c$.

If the accumulated value $\Sigma Q_N$ is equal to or is less than the upper limitation value $(Q_o)_c$, the accumulation is continued, but when the accumulation value $\Sigma Q_o$ exceeds the upper limitation value $(Q_o)_c$ the accumulation is released in step 1008-002, and processing advances to step 1009.

Figure 12:
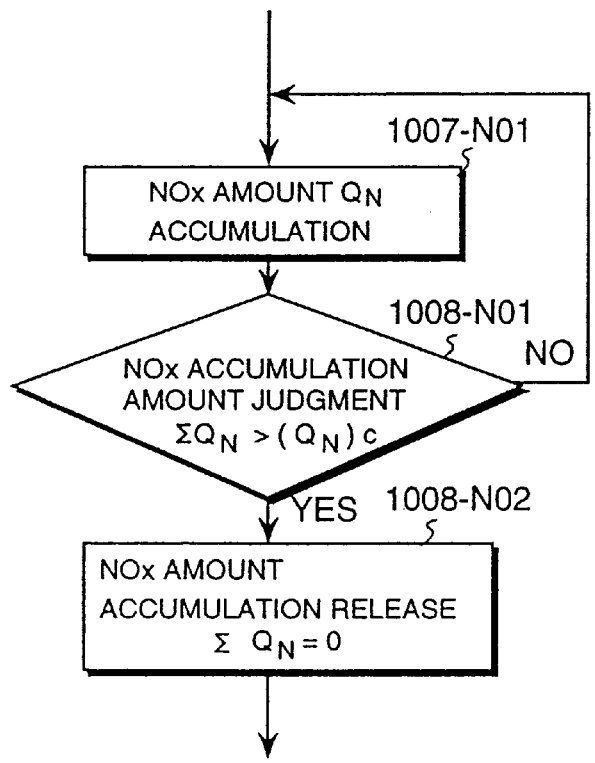
FIG. 12 is a flow chart showing $NO_x$ amount assumption in the flow chart shown in FIG. 8.

FIG. 12 shows a method for evaluating the $NO_x$ adsorbing ability of the catalyst according to the $NO_x$ concentration sensor signal which is detected in the inlet port of the catalyst during lean operation.

In step 1007-NO1, the $NO_x$ amount $Q_N$ in the inlet port of the catalyst is accumulated based on $NO_x$ concentration sensor signal. In step 1008-NO1 the accumulated value $\Sigma Q_N$ is compared with the upper limitation value $(Q_N)_c$. If the accumulated value $\Sigma Q_N$ is equal to or is less than the upper limitation value $(Q_N)_c$, the accumulation is continued; but when the accumulation value $\Sigma Q_N$ exceeds the upper limitation value $(Q_N)_c$ the accumulation is released in step 1008-002, and processing goes to step 1009.

Figure 13:
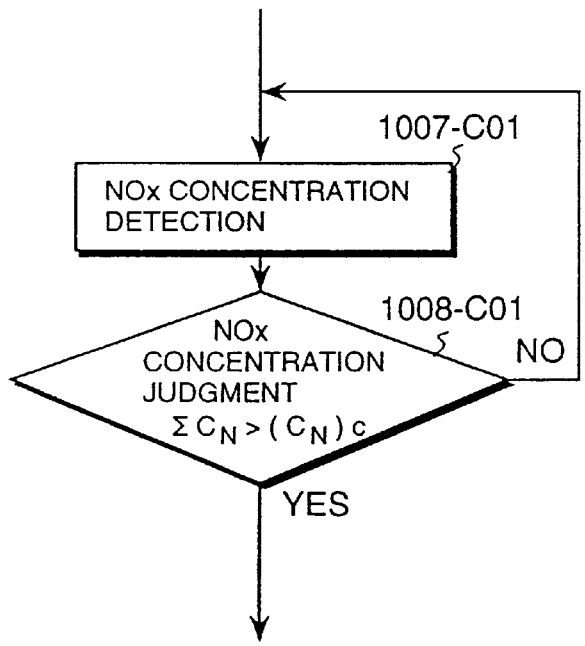
FIG. 13 is a flow chart Showing $NO_x$ amount assumption in the flow chart shown in FIG. 8.

FIG. 13 shows a method for judging $NO_x$ adsorbing ability according to $NO_x$ concentration sensor signal which is detected in the outlet port of the catalyst during the lean operation time.

In step 1007-CO1, $NO_x$ amount $C_N$ in the outlet port of the catalyst is accumulated according to $NO_x$ concentration sensor signal. In step 1008-CO1 the size between the accumulation value $\Sigma C_N$ and the upper limitation value $(C_N)_c$ of the accumulated $NO_x$ amount is compared.

When the accumulated value $\Sigma C_N$ is equal to or is less than the upper limitation value $(C_N)_c$ the accumulation is continued; but if the accumulated value $\Sigma C_N$ is more than the upper limitation value $(C_N)_c$, the process advances to step 1009.

Figure 14:
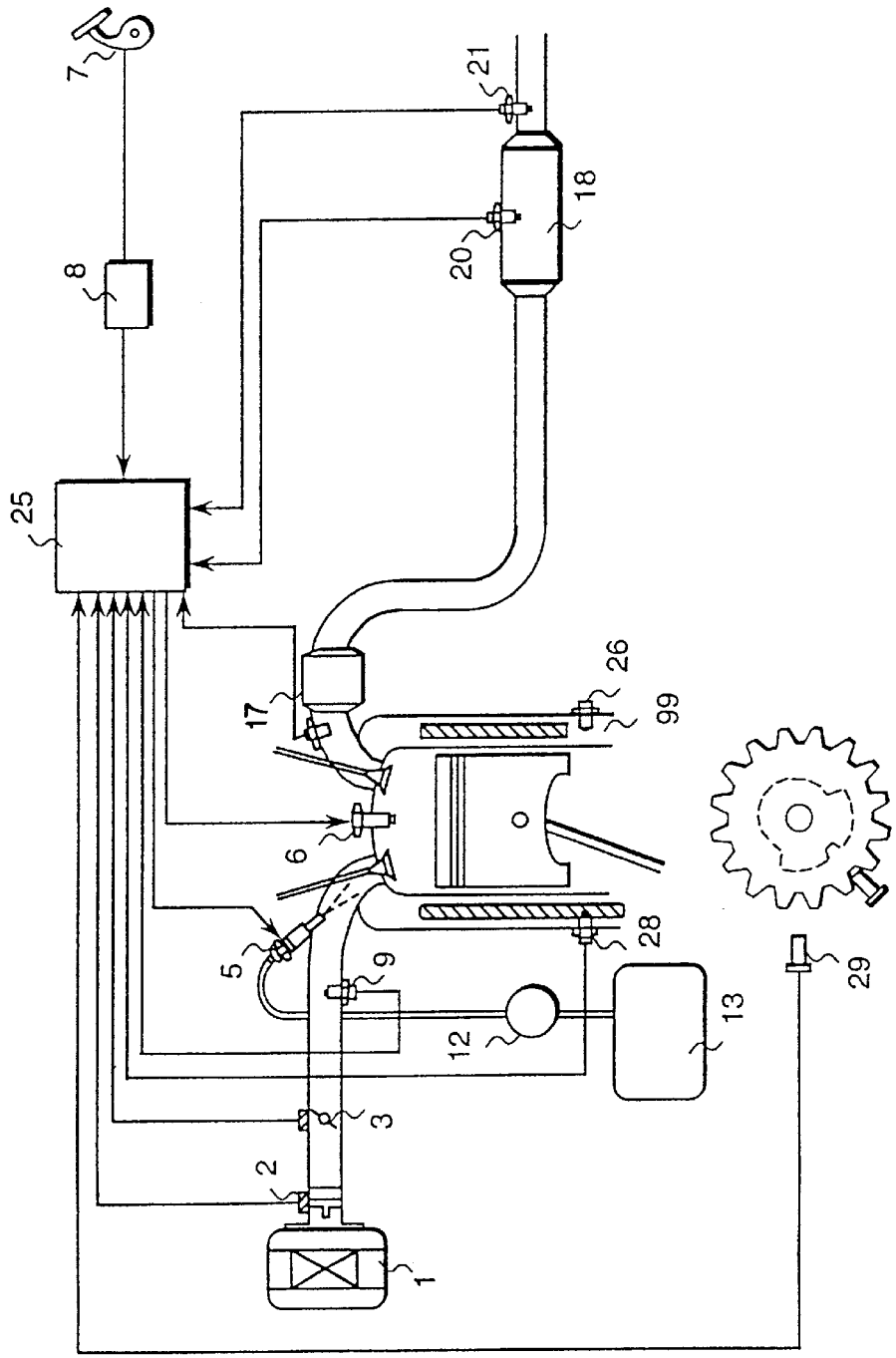
FIG. 14 is a schematic depiction of an embodiment of an exhaust gas purification apparatus in which a manifold catalyst is provided.

FIG. 14 shows another embodiment of an exhaust gas purification apparatus according to the present invention. The structural difference between the embodiment shown in FIG. 1 and this embodiment is the provision of a manifold catalyst 17 which is arranged on the exhaust air duct in the vicinity of the engine 99.

Reinforcement of the discharging regulation of the exhaust gas in the automobile is necessary to purify the harmful materials such as HC which are discharged immediately after the engine starting time. In the prior technique, however, harmful materials are discharged without treatment until the catalyst reaches to the working temperature. It is thus necessary to reduce substantially the non-treated amount of the harmful materials. A method for abruptly heating the catalyst to the working temperature is effective for this purpose.

FIG. 14 shows apparatus which diminishes the amount of HC and CO which is discharged during engine starting, and also provides exhaust gas purification during lean and stoichiometric operation (including rich operation time).

In the construction shown in FIG. 14, the manifold catalyst 17, may be a three component catalyst comprised mainly of Pt, Rh, and $CeO_2$, a material in which Pd is added to the three component catalyst, and a combustion catalyst which is comprised of combustion active components such as Pd as a main component. In this construction, during the engine starting the temperature of the manifold catalyst 17 rises rapidly and the purification of HC and CO is carried out immediately after engine starts.

During stoichiometric operation both the manifold catalyst 17 and the catalyst 18 function, and purification for HC, CO and $NO_x$ is carried out. During lean operation the catalyst 18 adsorption-purifies $NO_x$.

For regeneration of the catalyst 18, the air-fuel ratio is shifted to the rich side. Because HC and CO gaseous reducing agents) are largely chemically changed by the manifold catalyst 17, they can reach the catalyst 18 and regenerates it. The above stated construction, which includes the catalyst 18 is thus an important advantageous feature.

Figure 15:
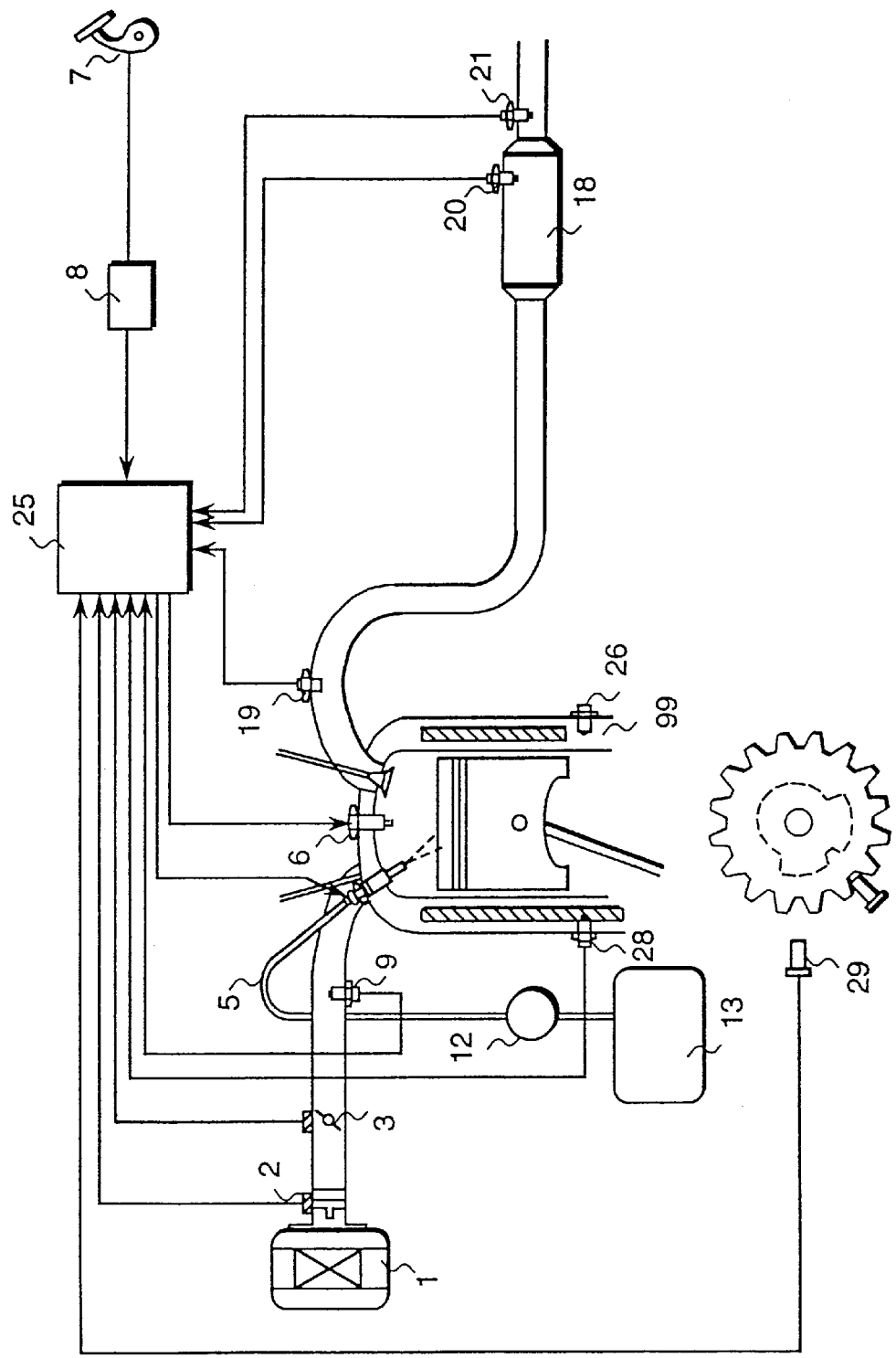
FIG. 15 shows an embodiment of an exhaust gas purification apparatus in a fuel direct injection in-cylinder engine.

FIG. 15 shows a further embodiment of an exhaust gas purification apparatus according to the present invention. The difference between the construction shown in FIG. 1 and that of FIG. 15 is that the engine 99 is a direct fuel injection system. As this figure demonstrates, the apparatus according to the present invention, can suitably apply to the direct fuel inject system engine.

Figure 16:
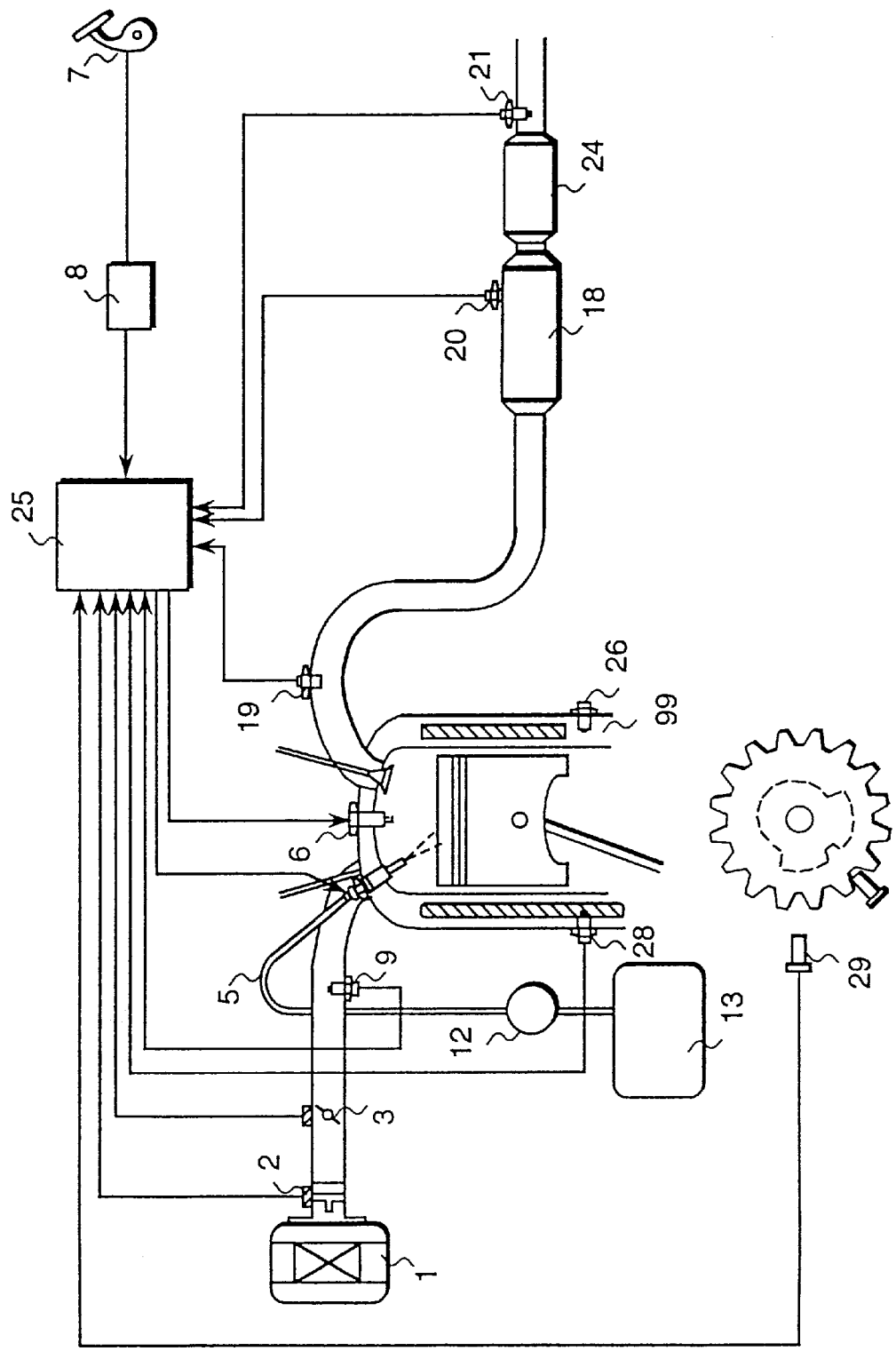
FIG. 16 shows an embodiment of an exhaust gas purification apparatus in which a post-catalyst is provided.

FIG. 16 shows a further embodiment of an exhaust gas purification apparatus according to the present invention. The difference between this construction and the ones shown in FIG. 1 and FIG. 15 is that a post-catalyst element 24 is provided downstream of the catalyst 18. For example, by arranging the combustion catalyst on the post-catalyst element 24, HC purification ability can be improved. Further, arrangement of the three way catalyst on the post-catalyst 24 can reinforce the three way function during the stoichiometric operation.

Figure 17:
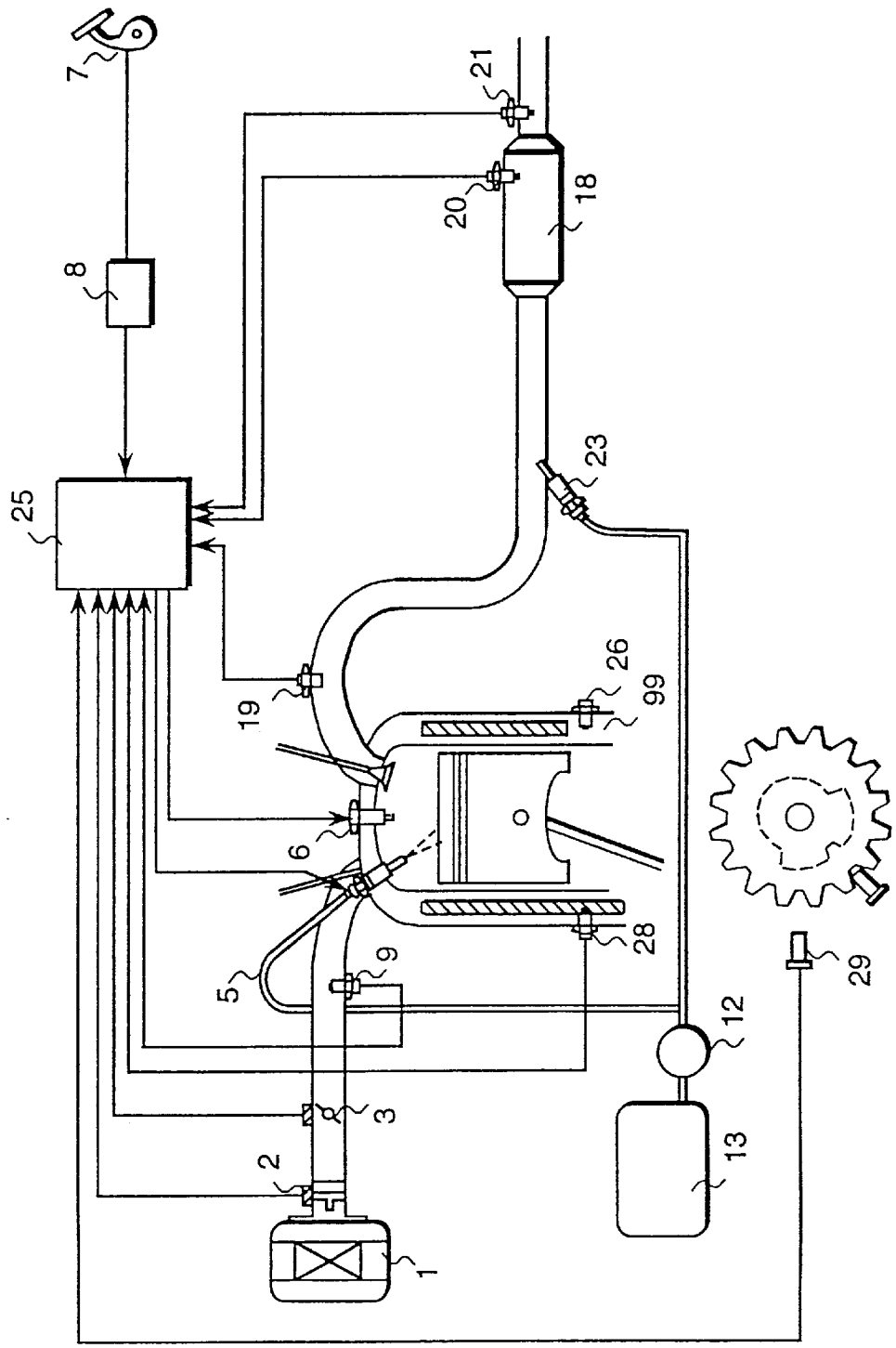
FIG. 17 shows an embodiment of an exhaust gas purification apparatus in which a gaseous reducing agent is added to an upstream of a catalyst.

FIG. 17 shows a further embodiment of an exhaust gas purification apparatus according to the present invention. The difference between this construction and the ones shown in FIG. 1 and FIGS. 14–16 resides is that upon indication of a rich-shift, the fuel is added upstream of the catalyst 18 through a gaseous reducing agent injector 23. In this system, the desired operation conditions of the engine can be established regardless of the conditions of the catalyst 18.

Hereinafter, the effects achieved by the present invention will be explained by reference to the graphic depictions in FIGS. 18–26.

The exhaust gas purification performance of the catalyst and of the exhaust gas purification apparatus according to the present invention were evaluated as follows: A first test catalyst and a comparison catalyst were mounted on a lean burn specification automobile having a displacement volume of 1.8 liters; and the automobile was run on a chassis dynamometer. Both the test catalysts were of a honeycomb shape, having 400 cell/in² and a volume of 1.7 liters, they were heat-treated at 700° C. under an oxidization atmosphere and were put below the floor.

The running speed was kept constant at 10–15 modes running, based on the Japanese exhaust gas regulation measurement method. The exhaust gas was analyzed using two methods. In a first method, $NO_x$, HC, and CO concentrations in the exhaust gas were measured and analyzed directly using the automobile exhaust gas measurement apparatus. The second method provided for measuring CVS (constant volume sampling) value, using the automobile constant volume dilution sampling apparatus.

Further, in 10–15 mode running, the A/F ratio was maintained in the lean range (A/F=22–23) during constant speed running time, during acceleration from 20 km/h to 40 km/h at 10 mode, and acceleration time from 50 km/h to 70 km/h at 15 mode. The rest of the running was performed at the stoichiometric A/F ratio.

Figure 18A:
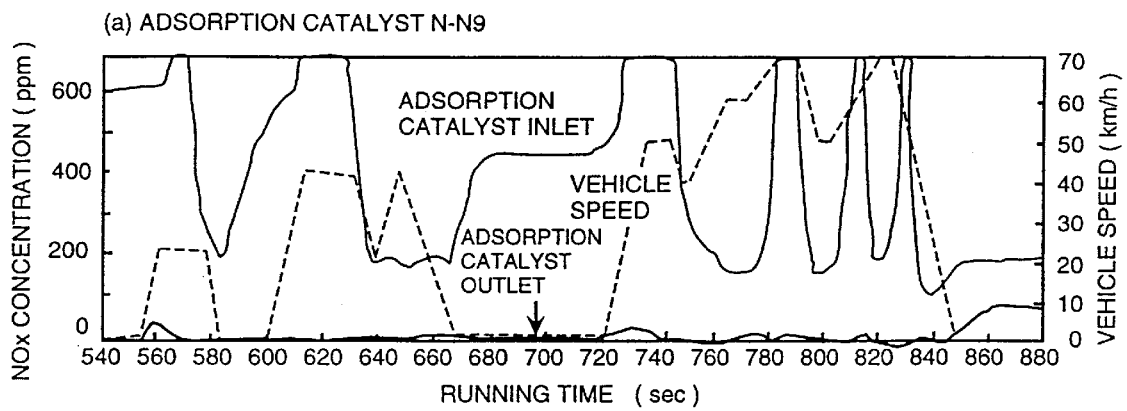
FIGS. 18A, 18B and 18C are views showing $NO_x$ purification characteristic where a mode operation is carried out.
Figure 18B:
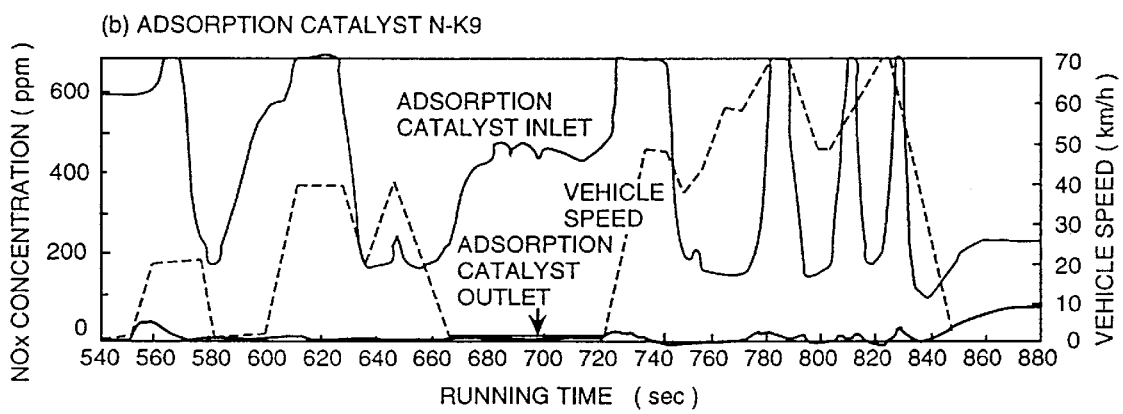
Figure 18C:
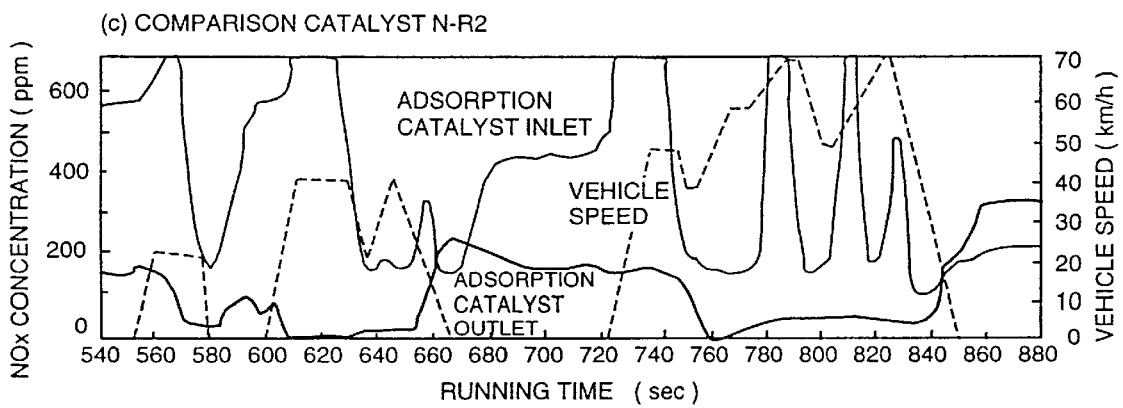

FIGS. 18A–18C show $NO_x$ concentrations at the inlet port and the outlet port of the catalyst at the last of the 10 modes (which were repeated three times,) and 15 mode which succeeded the last 10 mode, using the catalyst N-N9 according to the present invention (FIG. 18A), the catalyst N-K9 according to the present invention (FIG. 18B), and the catalyst N-R2 according to the comparison example (FIG. 18C). The comparison catalyst had the composition shown in Table 2 (below).

In FIGS. 18A and 18B, it can be seen that for the catalysts N-N9 and N-K9, the outlet port $NO_x$ concentration was lower than the inlet port $NO_x$ concentration at all operation areas. Since lean operation and the stoichiometric operation were carried out repeatedly, the catalyst was regenerated effectively and $NO_x$ purification ability was held and continued. On the other hand, in the comparison catalyst N-R2, it can be seen that during a portion of the time the outlet port $NO_x$ concentration exceeded the inlet port $NO_x$ concentration.

Tables 2 and 3 show the CVS value obtained by the various kinds of the catalyst and the comparison catalyst, together with the catalyst compositions. The preparations for the catalyst and the comparison catalyst were performed by the above stated methods. However, as the preparation raw materials, barium nitrate was used as barium (Ba) and silica-sol was used as silicon (Si). It is assumed that Si exists a silica ($SiO_2$) or a complex oxide thereof.

TABLE 2

| | marks | composition | CVS value (g/km) | | |
|---|---|---|---|---|---|
| | | | $NO_x$ | HC | CO |
| comparison catalyst | N-R1 | (0.2Rh, 2.7Pt) - 27Ce/$Al_2O_3$ | 0.15 | 0.02 | 0.07 |
| | N-R2 | 2Mg - (0.2Rh, 2.7Pt) - 27Ce/$Al_2O_3$ | 0.15 | 0.02 | 0.04 |
| adsorption catalyst | N-S1 | 2Mg - (0.2Rh, 2.7Pt) - 30Sr - 27Ce/$Al_2O_3$ | 0.08 | 0.10 | 0.08 |
| | N-S2 | 2Mg - (0.2Rh, 2.7Pt) - (30Sr, 2Mg) - 27Ce/$Al_2O_3$ | 0.09 | 0.05 | 0.08 |
| | N-S3 | (0.2Rh, 2.7Pt) - (30Sr, 4Ti) - 27Ce/$Al_2O_3$ | 0.11 | 0.08 | 0.11 |
| | N-S4 | 2Mg - (0.2Rh, 2.7Pt) - (30Sr, 4Ti) - 27Ce/$Al_2O_3$ | 0.10 | 0.07 | 0.09 |
| | N-S5 | 2Mg - (0.2Rh, 2.7Pt) - (30Sr, 4Si) - 27Ce/$Al_2O_3$ | 0.10 | 0.08 | 0.09 |
| | N-N1 | 2Mg - (0.2Rh, 2.7Pt) - 18Na - 27Ce/$Al_2O_3$ | 0.06 | 0.08 | 0.03 |
| | N-N2 | 2Mg - (0.2Rh, 2.7Pt) - (18Na, 2Mg) - 27Ce/$Al_2O_3$ | 0.06 | 0.12 | 0.04 |
| | N-N3 | (0.2Rh, 2.7Pt) - (18Na, 4Ti) - 27Ce/$Al_2O_3$ | 0.07 | 0.16 | 0.10 |
| | N-N4 | 2Mg - (0.2Rh, 2.7Pt) - (18Na, 4Ti) - 27Ce/$Al_2O_3$ | 0.06 | 0.15 | 0.08 |
| | N-N5 | (0.2Rh, 2.7Pt) - (18Na, 4Si) - 27Ce/$Al_2O_3$ | 0.05 | 0.10 | 0.12 |
| | N-N6 | 2Mg - (0.2Rh, 2.7Pt) - (18Na, 4Si) - 27Ce/$Al_2O_3$ | 0.06 | 0.08 | 0.06 |
| | N-N7 | 2Mg - (0.2Rh, 2.7Pt) - (10Na, 10Sr) - 27Ce/$Al_2O_3$ | 0.05 | 0.10 | 0.05 |
| | N-N8 | (0.2Rh, 2.7Pt) - -(18Na, 4Ti, 2Mg) - 27Ce/$Al_2O_3$ | 0.07 | 0.12 | 0.07 |

TABLE 2-continued

|  | marks | composition | CVS value (g/km) | | |
|---|---|---|---|---|---|
|  |  |  | NO$_x$ | HC | CO |
|  | N-N9 | 2Mg - (0.2Rh, 2.7Pt) - (18Na, 4Ti, 2Mg) - 27Ce/Al$_2$O$_3$ | 0.04 | 0.11 | 0.04 |
|  | N-N10 | 2Mg - (0.2Rh, 2.7Pt) - (10Na, 4Ti, 2Mg) - 27Ce/Al$_2$O$_3$ | 0.04 | 0.06 | 0.04 |

TABLE 3

|  | marks | composition | CVS value (g/km) | | |
|---|---|---|---|---|---|
|  |  |  | NO$_x$ | HC | CO |
|  | N-K1 | 2Mg - (0.2Rh, 2.7Pt) - -18K - 27Ce/Al$_2$O$_3$ | 0.06 | 0.08 | 0.03 |
| adsorption | N-K2 | 2Mg - (0.2Rh, 2.7Pt) - -(18K, 2Mg) - 27Ce/Al$_2$O$_3$ | 0.05 | 0.10 | 0.05 |
| catalyst | N-K3 | (0.2Rh, 2.7Pt) - -(18K, 4Si) - 27Ce/Al$_2$O$_3$ | 0.08 | 0.11 | 0.06 |
|  | N-K4 | 2Mg - (0.2Rh, 2.7Pt) - -(18K, 4Si) - 27Ce/Al$_2$O$_3$ | 0.05 | 0.08 | 0.05 |
|  | N-K5 | 2Mg - (0.2Rh, 2.7Pt) - -(18K, 4Si) - 27Ce/Al$_2$O$_3$ | 0.06 | 0.08 | 0.05 |
|  | N-K6 | (0.2Rh, 2.7Pt) - -(18K, 10Sr) - 27Ce/Al$_2$O$_3$ | 0.07 | 0.12 | 0.08 |
|  | N-K7 | 2Mg - (0.2Rh, 2.7Pt) - -(18K, 4Ti, 2Mg) - 27Ce/Al$_2$O$_3$ | 0.05 | 0.10 | 0.05 |
|  | N-K8 | (0.2Rh, 2.7Pt) - -(18K, 4Ti, 2Mg) - 27Ce/Al$_2$O$_3$ | 0.05 | 0.10 | 0.07 |
|  | N-K9 | 2Mg - (0.2Rh, 2.7Pt) - -(18[Na]K, 4Ti, 2Mg) - 27Ce/Al$_2$O$_3$ | 0.05 | 0.07 | 0.04 |
|  | N-K10 | 2Mg - (0.2Rh, 2.7Pt) - (10K, 10Sr, 2Mg) - 27Ce/Al$_2$O$_3$ | 0.04 | 0.07 | 0.08 |
|  | N-M1 | 2Mg - (0.2Rh, 2.7Pt) - -(10Na, 10K, 4Ti) - 27Ce/Al$_2$O$_3$ | 0.05 | 0.05 | 0.08 |
|  | N-M2 | 2Mg - (0.2Rh, 2.7Pt) - -(10Na, 10K, 10Si) - 27Ce/Al$_2$O$_3$ | 0.06 | 0.05 | 0.08 |
|  | N-M3 | 2Mg - (0.2Rh, 2.7Pt) - -(10Na, 10K, 10Sr) - 27Ce/Al$_2$O$_3$ | 0.06 | 0.10 | 0.05 |
|  | N-M4 | 2Mg - (0.2Rh, 2.7Pt) - -(10Na, 10K, 4Ti, 2Mg) - 27Ce/Al$_2$O$_3$ | 0.05 | 0.11 | 0.05 |

For the various kinds of the catalyst, the exhaust gas purification performances were measured using a model exhaust gas.

Modified Catalysts

Experiment 1

(Preparation Method)

The alumina powders and alumina nitrate slurry as a precursor thereof were coated on a cordierite honeycomb (400 cell/in$^2$), and the honeycomb had deposited thereon an alumina coating of 150 g per liter of apparent volume of the honeycomb. The alumina coated honeycomb was then impregnated with a cerium nitrate solution, dried at 200° C., and calcined for 1 (one) hour at 600° C. Thereafter, the honeycomb was impregnated with a mixture liquid comprised of sodium nitrate (NaNO$_3$) solution and magnesium nitrate (MgNO$_3$) solution was similarly dried and calcined.

Next, the honeycomb was impregnated by a mixture solution comprised of dinitrodiamime platinum nitrate solution and rhodium nitrate (Rh(NO$_3$)$_2$) solution, dried at 200° C. and calcined for 1 (one) hour at 450° C. Finally, a magnesium nitrate (Mg(NO$_3$)$_2$) solution was impregnated, and the honeycomb was dried at 200° C. and calcined for 1 (one) hour at 450° C.

With the above stated method, Embodiment Catalyst 1 was obtained, in which to 100 wt % Al$_2$O$_3$, 18 wt % Ce, 12 wt % Na, and 1.2 wt % Mg were held at the same time. In addition this Embodiment Catalyst 1 also contained 1.6 wt % Pt, 0.15 wt % Rh, and 1.5 wt % Mg.

Using a similar method, Embodiment Catalysts 2–4 were obtained.

As clearly shown in above, an NO$_x$ adsorption catalyst is provided in the exhaust gas flow passage, and under the oxidization atmosphere of a lean exhaust gas, NO$_x$ is caught according to the chemical adsorption. Thus, a reduction atmosphere is formed and the adsorption catalyst is regenerated. Accordingly, NO$_x$ etc. in the lean burn exhaust gas can be purified with high efficiency, without significantly affecting the fuel consumption.

The compositions of the prepared catalysts are shown in Table 4. The support order in this Table 4 indicates that after a first component has been applied, a second component and then the third and the fourth were applied, with the amount of each being indicated preceding the symbol.

TABLE 4

|  | support order | | | |
|---|---|---|---|---|
|  | first component | second component | third component | fourth |
| Embodiment Catalyst 1 | 18 wt % Ce | 12 wt % Na 1.2 wt % Mg | 0.15 wt % Rh 1.6 wt % Pt | 1.5 wt % Mg |
| Embodiment Catalyst 2 | 18 wt % Ce | 12 wt % Na 1.2 wt % Mg 7 wt % Sr | 0.15 wt % Rh 1.6 wt % Pt |  |
| Embodiment Catalyst 3 | 18 wt % Ce | 12 wt % Na 1.2 wt % Mg | 0.15 wt % Rh 1.6 wt % Pt |  |
| Embodiment Catalyst 4 | 18 wt % Ce | 1.5 wt % Na 1.5 wt % Mg | 1.5 wt % Pd 1.5 wt % pt |  |

(Experimentation Manner)

(1) honeycomb shape catalyst of 6 cc (17 mm square; 21 mm length) was filled up in a Pyrex reaction tube.

(2) The reaction tube was put into a ring shaped electric furnace and heated to the temperature of 300° C. (As the reaction temperature, the honeycomb inlet port gas temperature was measured.) After the temperature stabilized at 300° C., a flow of a model exhaust gas of the stoichiometric ratio (a "stoichiometric model exhaust gas") was started. After 3 (three) minutes, the flow of the stoichiometric model exhaust gas was stopped,, and a flow of a lean ratio model exhaust gas (a "lean model exhaust gas") was started.

NO$_x$ in the gas discharged from the reaction tube was measured by the chemical luminescence detection method, and HC was measured by the FID method.

$NO_x$ purification performance and HC purification performance obtained by this method were made as an initial period performance.

(3) The reaction tube where the honeycomb catalyst used in (2) above was filled up, put into the ring shaped electric furnace and raised to the temperature of 300° C. (As the reaction temperature, the honeycomb inlet port gas temperature was measured.)

After the temperature stabilized at 300° C., a flow of the stoichiometric model exhaust gas which contains $SO_2$ gas as a catalyst poison was started. The $SO_2$ poisoning operation was finished by flowing the poisoning gas $SO_2$ gas for five hours.

After the above stated $SO_2$ poisoning using the honeycomb catalyst, a test similar to (2) above was carried out and $NO_x$ purification performance and HC purification performance of after $SO_2$ poisoning were obtained.

(4) The honeycomb catalyst used in (2) above was put into a baking furnace and under the air atmosphere the honeycomb catalyst was calcined at 300° C. for five hours. After the cooling of the honeycomb catalyst, $NO_x$ purification performance and HC purification performance similar to (2) above were measured.

As the stoichiometric model exhaust gas, the gas comprised of 0.1 vol % NO, 0.05 vol % $C_3H_6$, 0.6 vol % CO, 0.6 vol % $O_2$, 0.2 vol % $H_2$, 10 vol % water vapor and the balance of $N_2$.

Further, as the lean model exhaust gas, the gas comprised of 0.06 vol % NO 0.04 vol % $C_3H_6$, 0.1 vol % CO, 10 VOl % $CO_2$, 5 vol % $O_2$, 10 vol % water vapor and the balance of $N_2$.

In the above stoichiometric model exhaust gas, $C_3H_6$, CO, $H_2$ are the gaseous reducing agents and $O_2$ and NO are the gaseous oxidizing agents. The gaseous oxidizing agent amount is 0.65% for converting into $O_2$ and the gaseous reducing agent amount is 0.575% for converting into $O_2$ consumption ability. Accordingly, both were balanced.

In the lean mode exhaust gas, $C_3H_6$ and CO are the gaseous reducing agents and $O_2$ and NO are the gaseous oxidizing agents. The gaseous oxidizing agent amount is 5.03% for converting into $O_2$ and the gaseous reducing agent amount is of 0.23% for converting into $O_2$ consumption ability. Accordingly, there is an excess amount of oxygen ($O_2$) of 4.8%.

As the gas used for catalyst poisoning, the gas comprised of 0.1 vol % NO, 0.05 vol % $C_3H_6$, 0.6 vol % CO, 0.005 vol % $SO_2$, 10 vol % water vapor and the balance of $N_2$.

The space velocities of the above three kinds gases were 30,000/h in the dry gas base (not containing the water vapor).

Table 5 shows the purification rate of the honeycomb catalyst of the initial period and after the poisoning by $SO_2$. Here, $NO_x$ purification rate was obtained after 1 (one) minute where the stoichiometric model exhaust gas was changed over to the lean model exhaust gas.

TABLE 5

|  | initial $NO_x$ purification rate (%) | | $NO_x$ purification rate (%) after poisoning by $SO_2$ | | $NO_x$ purification rate (%) after 800° C. calcination | |
|---|---|---|---|---|---|---|
|  | 300° C. | 400° C. | 300° C. | 400° C. | 300° C. | 400° C. |
| Embodiment Catalyst 1 | 91 | 94 | 76 | 67 | 58 | 49 |
| Embodiment Catalyst 2 | 98 | 97 | 85 | 70 | 67 | 62 |

TABLE 5-continued

|  | initial $NO_x$ purification rate (%) | | $NO_x$ purification rate (%) after poisoning by $SO_2$ | | $NO_x$ purification rate (%) after 800° C. calcination | |
|---|---|---|---|---|---|---|
|  | 300° C. | 400° C. | 300° C. | 400° C. | 300° C. | 400° C. |
| Embodiment Catalyst 3 | 91 | 94 | 75 | 65 | 55 | 45 |
| Embodiment Catalyst 4 | 90 | 90 | 70 | 60 | 55 | 45 |

$NO_x$ purification rate and HC purification rate were calculated according to following formula.

$NO_x$ purification rate=($NO_x$ concentration in inlet port gas–$NO_x$ concentration in outlet port gas)×100/($NO_x$ concentration in inlet port gas) Equation (1)

HC purification rate=(HC concentration in inlet port gas–HC concentration in outlet port gas)×100/(HC concentration in inlet port gas) Equation (2)

Embodiment Catalysts 1–4 had a high initial period performance and a heat resistant ability and a $SO_x$ endurance ability.

Embodiment Catalyst 5 was obtained by replacing the support material of Embodiment Catalyst 1 with La and Al complex oxide material (La-β-$Al_2O_3$)where the composition ratio of La—Al was 1–20 mol % La and 100 mol % sum of La and Al. The performances of Embodiment Catalyst 5 are shown in Table 6.

TABLE 6

|  | initial $NO_x$ purification rate (%) | | $NO_x$ purification rate (%) after poisoning by $SO_2$ | | $NO_x$ purification rate (%) after calcination at 800° C. | |
|---|---|---|---|---|---|---|
|  | 300° C. | 400° C. | 300° C. | 400° C. | 300° C. | 400° C. |
| Embodiment Catalyst 5 | 90 | 88 | 75 | 65 | 67 | 65 |

As the support was constituted by La—Al complex oxide material (La-β-$Al_2O_3$) the heat resistant ability was improved.

Figure 21:
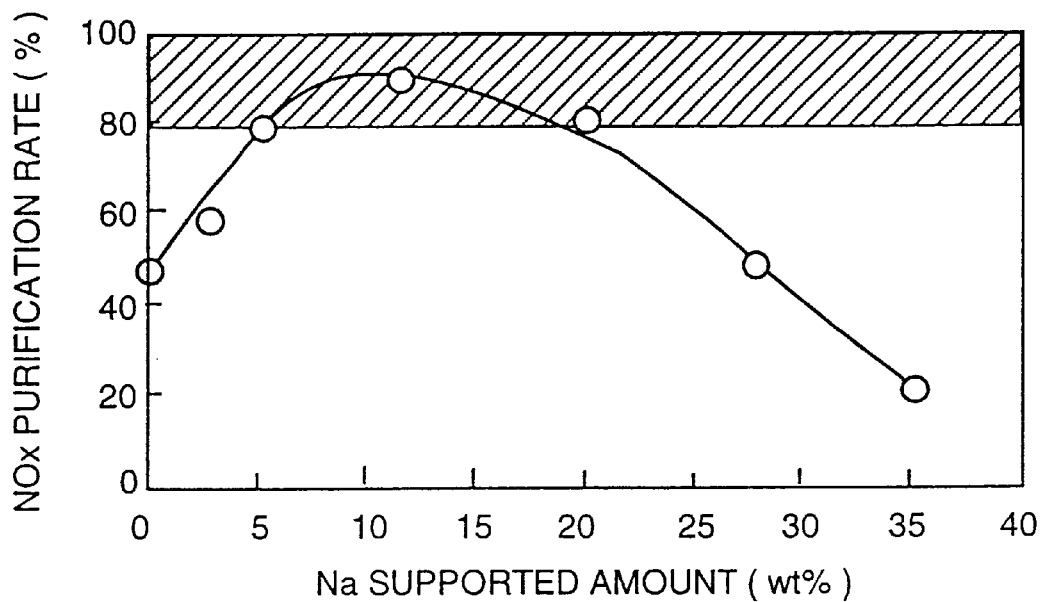
FIG. 21 shows an $NO_x$ purification rate for optimizing Na supported amount.

In Embodiment Catalyst 1, the initial period performance of $NO_x$ purification rate at 400° C. was measured, while the support amount of Na of the second component was varied. The catalyst preparation was similar to Embodiment Catalyst 1 and the experimentation manner was similar to Experiment 1. The results are shown in FIG. 21. To achieve a high $NO_x$ purification rate, it was suitable to make the Na supported amount 5–20 wt % to the total support.

Figure 22:
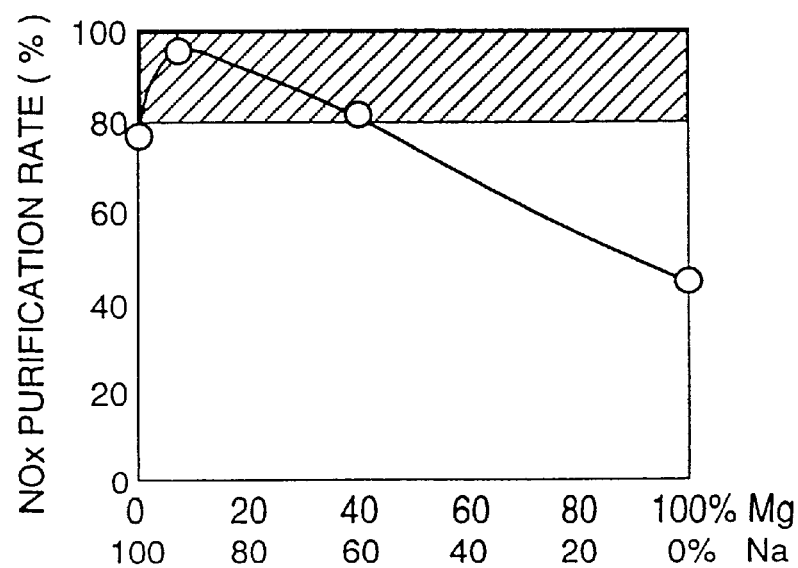
FIG. 22 shows an $NO_x$ purification rate for optimizing Mg supported amount.

In Embodiment Catalyst 1, the initial period performance of $NO_x$ purification rate at 400° C. was measured, while the supported amount of Mg of the second component was varied. The results are shown in FIG. 22. To achieve a high $NO_x$ purification rate, it was suitable to make the weight ratio between the Mg supported amount and (Na supported amount+Mg support amount) at 1–40 wt %.

In Embodiment Catalyst 1, the initial period performance of $NO_x$ purification rate at 400° C. was measured, while the supported amount of Ce of the first component was varied.

Figure 23:
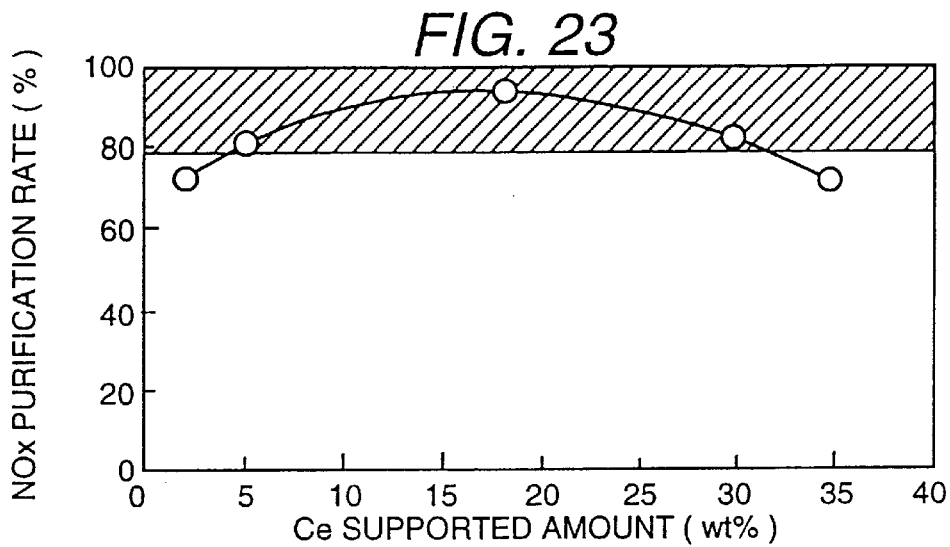
FIG. 23 shows an $NO_x$ purification rate for optimizing Ce supported amount.

The results are shown in FIG. 23. To achieve a high $NO_x$ purification rate, it was suitable to make Ce supported amount 5–30 wt %.

Figure 24:
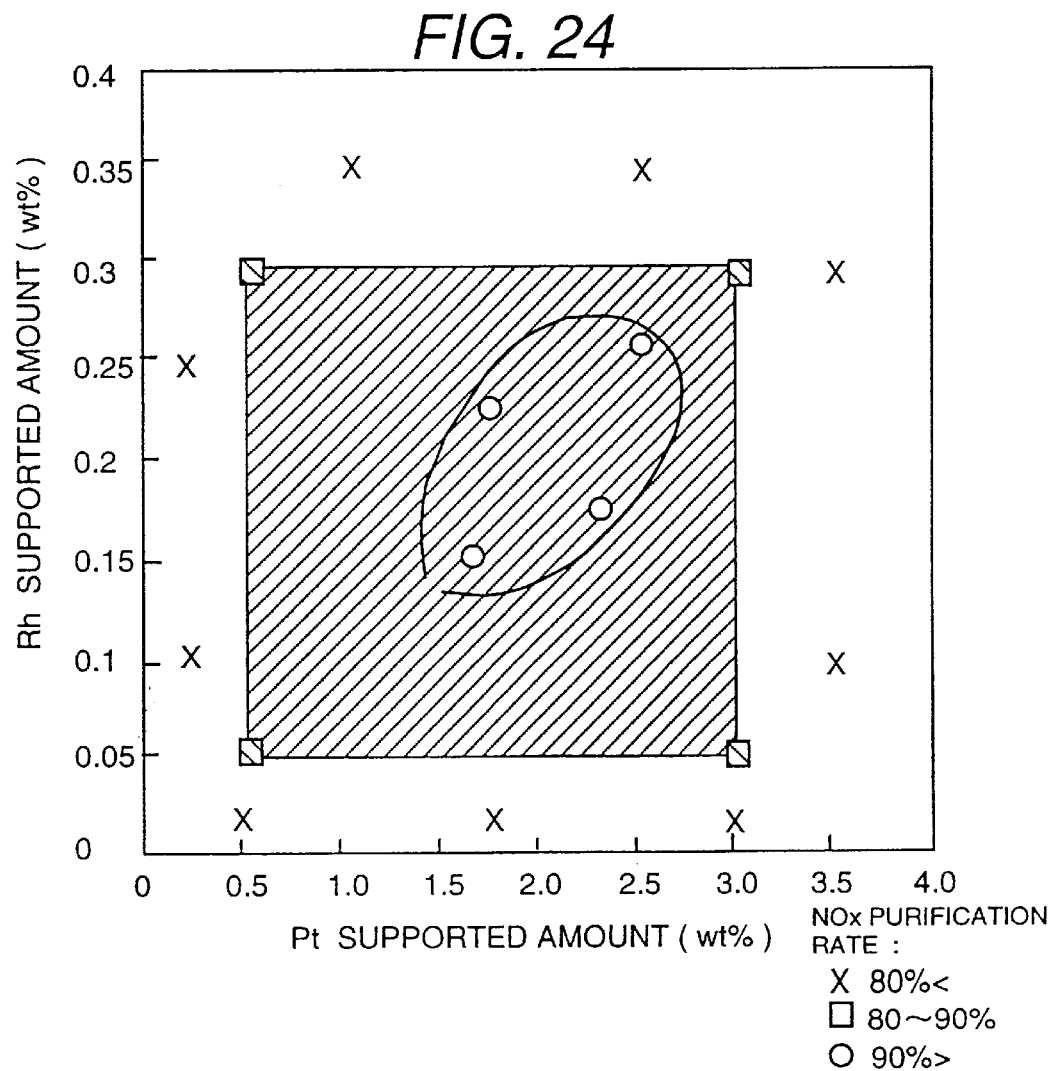
FIG. 24 shows an $NO_x$ purification rate for optimizing Rh and Pt supported amount.

In Embodiment Catalyst 1, the initial period performance of $NO_x$ purification rate at 400° C. was measured, while the supported amounts of Pt and Rh were varied. The results are shown in FIG. 24. To achieve a high $NO_x$ purification rate, it was suitable to make the supported amount of Pt 0.5–3 wt % and the supported amount of Rh 0.05–0.3 wt %.

Figure 25:
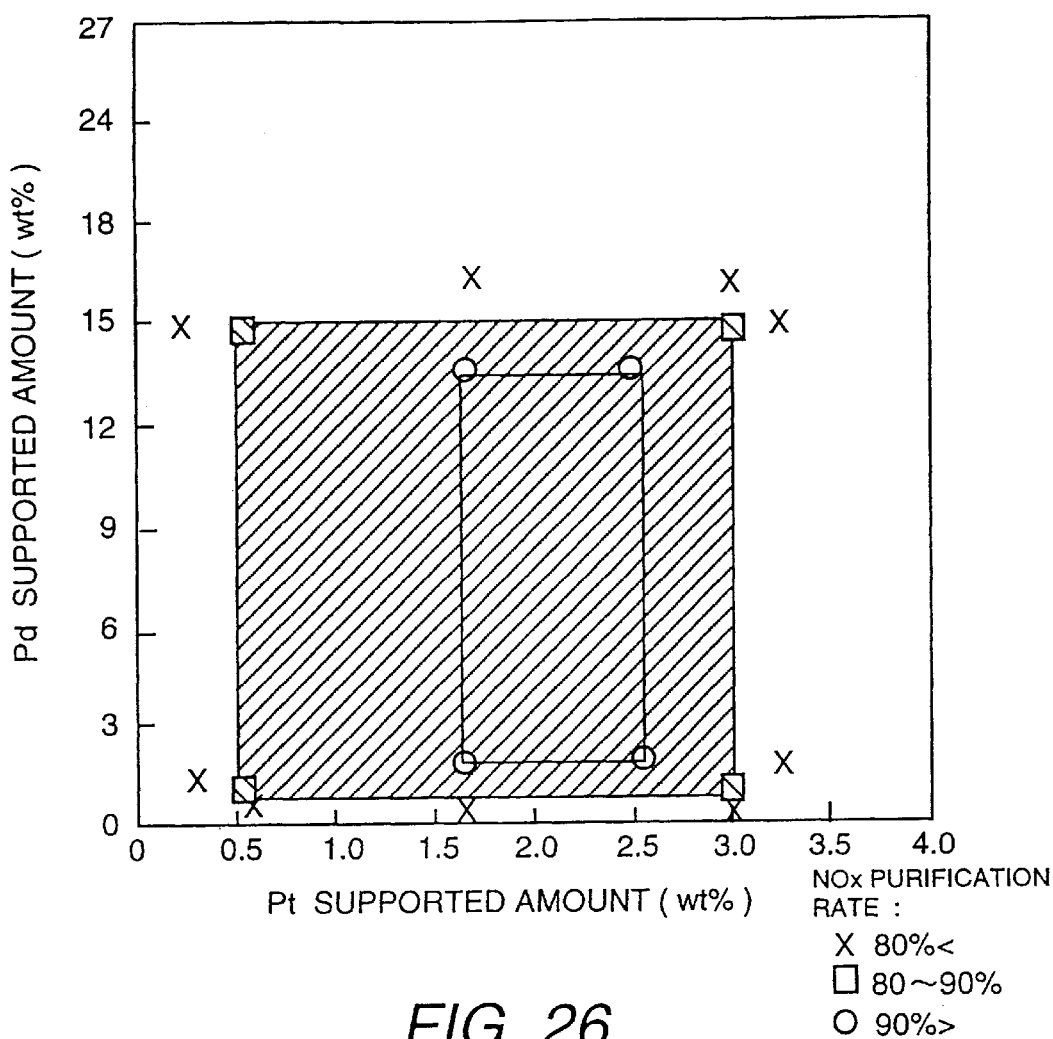
FIG. 25 shows an $NO_x$ purification rate for optimizing Pd and Pt supported amount.

In Embodiment Catalyst 1, the initial period performance of $NO_x$ purification rate at 400° C. was measured, while the supported amounts of Pt and Pd were varied. The results are shown in FIG. 25. To achieve a high $NO_x$ purification rate, it was suitable to make the supported amount of Pt 0.5–3 wt % and the supported amount of Pd 0.5–15 wt %.

Figure 26:
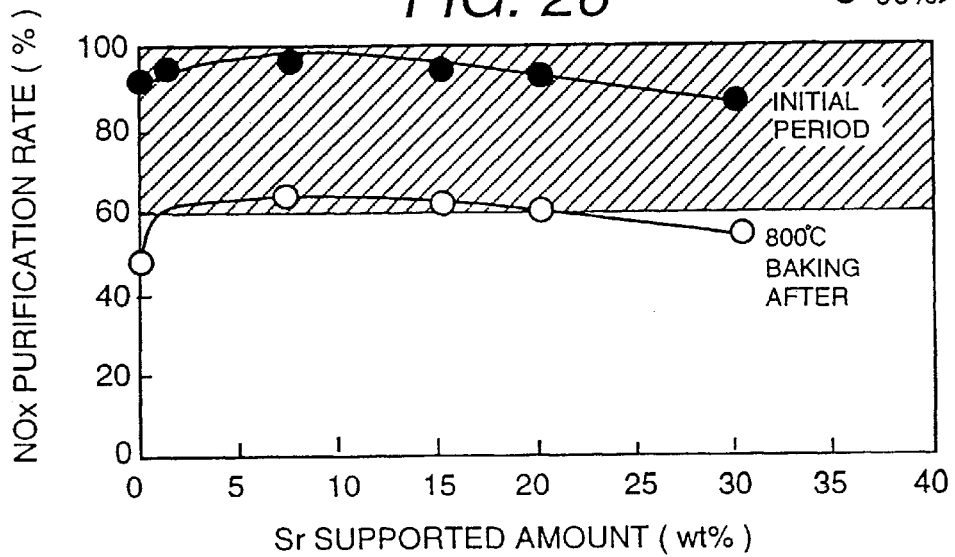
FIG. 26 shows an $NO_x$ purification rate for optimizing Sr supported amount.

In Embodiment Catalyst 2, initial period $NO_x$ purification rate at 400° C., after calcination at 800° C., was measured. The results are shown in FIG. 26. Since the supported amount of Sr was 1–20 wt %, the high $NO_x$ purification rate and the high heat resistant ability were obtained.

Experiment 2
(Preparation Method)

Water and dilute nitric acid were added to boehmite powers to form a slurry, which was wash-coated to a cordierite made honeycomb. After drying, the honeycomb was calcined for 1 (one) hour at 600° C., thereby obtaining an alumina coating of 150 g per liter.

The alumina coated honeycomb was immersed in Ce nitrate solution, dried and calcined for 1 (one) hour at 600° C. Next, the honeycomb was immersed in Sr nitrate solution, dried and calcined for 1 (one) hour at 600° C. Thereafter, the honeycomb was immersed in titaniasol solution as a precursor for titania, dried and calcined for 1 (one) hour at 600° C.

The honeycomb was then immersed in a solution containing dinitrodiamime Pt nitrate and Rh nitrate. After drying, it was calcined for 1 (one) hour at 450° C. Finally, the honeycomb was immersed in Mg nitrate solution, dried and calcined for 2 (two) hours at 450° C., forming honeycomb A.

The catalyst composition of the honeycomb catalyst A was comprised of alumina ($Al_2O_3$) of 100 Wt %' Mg of 1 wt %, Rh of 0.15 wt %, Pt of 1.9 wt %, Ti of 5 wt %, Sr of 15 wt %, and Ce of 18 wt %, which is the standard for other Embodiment Catalysts.

Further, for manufacturing the honeycomb catalyst, as an alternative to the above method of impregnating the catalyst components to the alumina coated honeycomb, it is possible to employ a method where the catalyst components are immersed into the aluminum powders and after the catalyst powders are prepared they are made into the slurry, which is coated onto the honeycomb substrate (honeycomb base body). Further, as the precursor of titania, in addition to the above titania-sol, an organo titanium compound, the titanium sulfate and the titanium chloride etc. can be used. As the alkali earth metals in place of Sr nitrate ($Sr(NO_3)_2$) using Ca nitrate ($Ca(NO_3)_2$), a honeycomb catalyst B was obtained.

Except for as the rare earth metals in place of cerium nitrate ($Ce(NO_3)_2$) using lanthanum nitrate ($La(NO_3)_2$), and a method similar to that used for honeycomb catalyst A, a honeycomb catalyst C was obtained. Further, using iridium nitrate, a honeycomb catalyst D was obtained.

By varying the concentration of the titania-sol used in the preparation of the honeycomb catalyst A, three kinds of honeycomb catalysts E, F and G having different Ti supported amounts were obtained.

By varying the concentration of strontium nitrate ($Sr(NO_3)_2$) used in the preparation of the honeycomb catalyst A, three kinds of honeycomb catalysts H, I and J having different Sr supported amounts were obtained.

By varying the concentration of dinitrodiamime Pt solution used in the preparation of the honeycomb catalyst A, three kinds of honeycomb catalysts K, L and M having different Pt supported amounts were obtained.

By varying the concentration of rhodium nitrate solution used in the preparation of the honeycomb catalyst A, three kinds of honeycomb catalysts N, O and P having different Rh supported amounts were obtained.

By varying the concentration of cerium nitrate solution used in the preparation of the honeycomb catalyst A, three kinds of honeycomb catalysts Q, R and S having different Ce supported amounts were obtained.

A honeycomb catalyst T was also obtained, which did not contain titanium (Ti) such as in the honeycomb catalyst A.

The catalyst compositions of the honeycomb catalysts A–T are shown in Table 7.

[TABLE 7]

| | catalyst composition (wt %) | | | | | | | $NO_x$ purification rate (%) | |
|---|---|---|---|---|---|---|---|---|---|
| | rare earth | | alkali earth | | Ti | Pt | Rh | Mg | initial period | after $SO_2$ endurance |
| A | Ce | 18 | Sr | 15 | 5 | 1.9 | 0.15 | 1 | 83 | 77 |
| B | Ce | 18 | Ca | 15 | 5 | 1.9 | 0.15 | 1 | 82 | 72 |
| C | La | 18 | Sr | 15 | 5 | 1.9 | 0.15 | 1 | 80 | 73 |
| D | Y | 18 | Sr | 15 | 5 | 1.9 | 0.15 | 1 | 81 | 72 |
| E | Ce | 18 | Sr | 15 | 0.1 | 1.9 | 0.15 | 1 | 80 | 71 |
| F | Ce | 18 | Sr | 15 | 1 | 1.9 | 0.15 | 1 | 81 | 73 |
| G | Ce | 18 | Sr | 15 | 30 | 1.9 | 0.15 | 1 | 80 | 72 |
| H | Ce | 18 | Sr | 3 | 5 | 1.9 | 0.15 | 1 | 80 | 70 |
| I | Ce | 18 | Sr | 7.5 | 5 | 1.9 | 0.15 | 1 | 82 | 75 |
| J | Ce | 18 | Sr | 40 | 5 | 1.9 | 0.15 | 1 | 81 | 72 |
| K | Ce | 18 | Sr | 15 | 5 | 0.2 | 0.15 | 1 | 80 | 69 |
| L | Ce | 18 | Sr | 15 | 5 | 1 | 0.15 | 1 | 81 | 73 |
| M | Ce | 18 | Sr | 15 | 5 | 4 | 0.15 | 1 | 85 | 76 |
| N | Ce | 18 | Sr | 15 | 5 | 1.9 | 0.15 | 1 | 80 | 73 |
| O | Ce | 18 | Sr | 15 | 5 | 1.9 | 0.5 | 1 | 82 | 74 |
| P | Ce | 18 | Sr | 15 | 5 | 1.9 | 1 | 1 | 81 | 72 |
| Q | Ce | 5 | Sr | 15 | 5 | 1.9 | 0.15 | 1 | 80 | 70 |
| R | Ce | 10 | Sr | 15 | 5 | 1.9 | 0.15 | 1 | 82 | 73 |
| S | Ce | 40 | Sr | 15 | 5 | 1.9 | 0.15 | 1 | 84 | 72 |
| T | Ce | 18 | Sr | 15 | 0 | 1.9 | 0.15 | 1 | 80 | 69 |

Test Manner 1:

As to the honeycomb catalysts A–T, under following conditions, $NO_x$ purification reaction activity was evaluated.

A honeycomb catalyst having 6 cc was filled up in a quartz reaction tube having an inner diameter of 25 mm and was arranged in an electric furnace.

The reaction tube was heated by the electric furnace, the inlet port gas temperature of the reaction tube was set at 300° C. constant and the following model gas was let flow.

As the exhaust gas for a condition where an internal combustion engine was operated with the stoichiometric air-fuel ratio, the model gas comprised 0.1% (volume ratio) NO, 0.05% $C_3H_6$, 0.6% CO, 0.5% $O_2$, 0.2% $H_2$, 10% $H_2O$, and the balance of $N_2$, and flowed at a space velocity of 30,000/h.

As the exhaust gas for a condition where an internal combustion engine was operated with the lean air-fuel ratio, the model gas comprised 0.06% (volume ratio) NO, 0.04% $C_3H_6$, 0.1% CO, 5% $O_2$, 10% $H_2O$, and the balance of $N_2$, and flowed at a space velocity of 30,000/h. The above model gases for the stoichiometric and lean air-fuel ratios were flowed alternately every three (3) minutes each.

In these model exhaust gases, the gaseous oxidizing agent amount is 0.55 vol % for converting into $O_2$ and the gaseous reducing agent amount of 0.625 for converting into $O_2$ consumption ability. Accordingly, both were substantially balanced.

The model gas for the stoichiometric air-fuel ratio and the model gas for the lean air-fuel ratio were flowed alternately every three (3) minutes each, and the inlet port $NO_x$ concentration and the outlet port $NO_x$ concentration of the catalyst at this time were measured according to the chemical luminescence detection $NO_x$ analyzer. And $NO_x$ purification rate one minute after the stoichiometric air-fuel ratio model exhaust gas was changed to the lean air-fuel ratio model exhaust gas was calculated according to the formula shown in Experiment 1.

Test Manner 2:

Except that the inlet port gas temperature was heated by the electric furnace at 400° C. constant, for each of the honeycomb catalysts A–T, $NO_x$ purification reaction activity was evaluated in a manner similar to Test Manner 1.

Test Manner 3:

Similar to Test Manner 1, the inlet port gas temperature was heated by the electric furnace at 300° C. constant. The gas, in which to the model gas used for the lean air-fuel ratio 0.005% $SO_2$ gas was added, was flowed at a space velocity of 30,000/h for 3 (three) hours. After that, for each of the honeycomb catalysts A–T, $NO_x$ purification reaction activity under the inlet port gas temperature of 300° C. was evaluated in a manner similar to Test Manner 1.

Test manner 4:

Similar to Test Manner 3, the gas, in which to the model for the lean air-fuel ratio 0.005% $SO_2$ gas was added, was flowed at 300° C. for 3 (three) hours. After that, for each of the honeycomb catalysts A–T, $NO_x$ purification reaction activity under the inlet port gas temperature of 400° C. was evaluated in a manner similar to Test Manner 2.

With respect to the honeycomb catalysts A–T, the results of the evaluations according to Test Manners 1 and 3 are shown in Table 7 and the results of the evaluations according to Test Manners 2 and 4 are shown in Table 8.

TABLE 7

| | catalyst composition (wt %) | | | | | | | $NO_x$ purification rate (%) | |
|---|---|---|---|---|---|---|---|---|---|
| | rare earth | | alkali earth | | Ti | Pt | Rh | Mg | initial period | after $SO_2$ endurance |
| A | Ce | 18 | Sr | 15 | 5 | 1.9 | 0.15 | 1 | 83 | 77 |
| B | Ce | 18 | Ca | 15 | 5 | 1.9 | 0.15 | 1 | 82 | 72 |
| C | La | 18 | Sr | 15 | 5 | 1.9 | 0.15 | 1 | 80 | 73 |
| D | Y | 18 | Sr | 15 | 5 | 1.9 | 0.15 | 1 | 81 | 72 |
| E | Ce | 18 | Sr | 15 | 0.1 | 1.9 | 0.15 | 1 | 80 | 71 |
| F | Ce | 18 | Sr | 15 | 1 | 1.9 | 0.15 | 1 | 81 | 73 |
| G | Ce | 18 | Sr | 15 | 30 | 1.9 | 0.15 | 1 | 80 | 72 |
| H | Ce | 18 | Sr | 3 | 5 | 1.9 | 0.15 | 1 | 80 | 70 |
| I | Ce | 18 | Sr | 7.5 | 5 | 1.9 | 0.15 | 1 | 82 | 75 |
| J | Ce | 18 | Sr | 40 | 5 | 1.9 | 0.15 | 1 | 81 | 72 |
| K | Ce | 18 | Sr | 15 | 5 | 0.2 | 0.15 | 1 | 80 | 69 |
| L | Ce | 18 | Sr | 15 | 5 | 1 | 0.15 | 1 | 81 | 73 |
| M | Ce | 18 | Sr | 15 | 5 | 4 | 0.15 | 1 | 85 | 76 |
| N | Ce | 18 | Sr | 15 | 5 | 1.9 | 0.15 | 1 | 80 | 73 |
| O | Ce | 18 | Sr | 15 | 5 | 1.9 | 0.5 | 1 | 82 | 74 |
| P | Ce | 18 | Sr | 15 | 5 | 1.9 | 1 | 1 | 81 | 72 |
| Q | Ce | 5 | Sr | 15 | 5 | 1.9 | 0.15 | 1 | 80 | 70 |
| R | Ce | 10 | Sr | 15 | 5 | 1.9 | 0.15 | 1 | 82 | 73 |
| S | Ce | 40 | Sr | 15 | 5 | 1.9 | 0.15 | 1 | 84 | 72 |
| T | Ce | 18 | Sr | 15 | 0 | 1.9 | 0.15 | 1 | 80 | 69 |

TABLE 8

| | catalyst composition (wt %) | | | | | | | $NO_x$ purification rate (%) | |
|---|---|---|---|---|---|---|---|---|---|
| | rare earth | | alkali earth | | Ti | Pt | Rh | Mg | initial period | after $SO_2$ endurance |
| A | Ce | 18 | Sr | 15 | 5 | 1.9 | 0.15 | 1 | 76 | 55 |
| B | Ce | 18 | Ca | 15 | 5 | 1.9 | 0.15 | 1 | 73 | 54 |
| C | La | 18 | Sr | 15 | 5 | 1.9 | 0.15 | 1 | 74 | 51 |
| D | Y | 18 | Sr | 15 | 5 | 1.9 | 0.15 | 1 | 70 | 48 |
| E | Ce | 18 | Sr | 15 | 0.1 | 1.9 | 0.15 | 1 | 67 | 45 |
| F | Ce | 18 | Sr | 15 | 1 | 1.9 | 0.15 | 1 | 72 | 50 |
| G | Ce | 18 | Sr | 15 | 30 | 1.9 | 0.15 | 1 | 74 | 53 |
| H | Ce | 18 | Sr | 3 | 5 | 1.9 | 0.15 | 1 | 67 | 46 |
| I | Ce | 18 | Sr | 7.5 | 5 | 1.9 | 0.15 | 1 | 72 | 49 |
| J | Ce | 18 | Sr | 40 | 5 | 1.9 | 0.15 | 1 | 77 | 54 |
| K | Ce | 18 | Sr | 15 | 5 | 0.2 | 0.15 | 1 | 65 | 44 |
| L | Ce | 18 | Sr | 15 | 5 | 1 | 0.15 | 1 | 70 | 51 |
| M | Ce | 18 | Sr | 15 | 5 | 4 | 0.15 | 1 | 80 | 54 |
| N | Ce | 18 | Sr | 15 | 5 | 1.9 | 0.15 | 1 | 66 | 45 |
| O | Ce | 18 | Sr | 15 | 5 | 1.9 | 0.5 | 1 | 76 | 52 |
| P | Ce | 18 | Sr | 15 | 5 | 1.9 | 1 | 1 | 72 | 48 |
| Q | Ce | 5 | Sr | 15 | 5 | 1.9 | 0.15 | 1 | 68 | 44 |
| R | Ce | 10 | Sr | 15 | 5 | 1.9 | 0.15 | 1 | 72 | 50 |
| S | Ce | 40 | Sr | 15 | 5 | 1.9 | 0.15 | 1 | 75 | 52 |
| T | Ce | 18 | Sr | 15 | 0 | 1.9 | 0.15 | 1 | 65 | 43 |

Each of Embodiment catalysts A–S has a high $NO_x$ purification rate after $SO_2$ endurance and a strong $SO_2$ resistivity in comparison with the catalyst T which does not contain titanium (Ti).

As to the honeycomb catalyst A, an X-ray analyzing spectrum was measured and the crystallization structure was identified. In the X-ray analyzing spectrum of the honeycomb catalyst A, there was no peak caused by titania ($TiO_2$) and it was considered that titania ($TiO_2$) had maintained a non-crystalline structure. It was understood that strontium (Sr) as alkali earth metals was held as carbonate.

Experiment 3

Cerium nitrate ($Ce(NO_3)_2$) solution was impregnated in alumina ($Al_2O_3$) and after drying at 200° C. the alumina was calcined at 600° C. for 1 hour. In succession, a mixture solution obtained by mixing strontium nitrate ($Sr(NO_3)_2$) with silica-sol was impregnated, similarly in the cerium (Ce) coated alumina was dried and calcined. With the above process, the catalyst powders were obtained, such catalyst powders were comprised of, to 100 wt % alumina ($Al_2O_3$), 18 wt % Ce, 15 wt % Sr, 4 wt % $SiO_2$, 1.6 wt % Pt, 0.15 wt % Rh, and 1.5 wt % Mg. Alumina-sol and aluminum nitrate ($Al(NO_3)_2$) were added to the catalyst powders and the slurry was obtained by agitating and mixed with them and the obtained slurry was coated to a cordierite made honeycomb (400 cell/$in^2$). The calcination temperature was about 450° C. and Embodiment Catalyst 100 having a final coating amount of 200 g/l.

According to a method similar to the above, Embodiment Catalysts 100–105 were obtained.

The composition of the prepared catalysts are show in Table 9. The support order in this Table 9 indicates that after a first component has applied, a second component is applied and next a third component and a fourth component are applied successively. Further, the supported amount is indicated before the supported metal symbol.

TABLE 9

| Embodiment Catalyst | support order | | | |
|---|---|---|---|---|
| | first component | second component | third component | fourth |
| 100 | 18 wt % Ce | 15 wt % Sr 4 wt % SiO$_2$ | 0.15 wt % Rh 1.6 wt % Pt | 1.5 wt % Mg |
| 101 | 18 wt % Ce | 15 wt % Sr 4 wt % SiO$_2$ | 0.15 wt% Rh 1.6 wt % Pt | |
| 102 | 18 wt % Ce | 7 wt % Sr 7 wt % Ca 4 wt % SiO$_2$ | 0.15 wt % Rh 1.6 wt % Pt | |
| 103 | 18 wt % Ce | 15 wt % Sr | 0.15 wt % Rh 1.6 wt % pt | |
| 104 | 18 wt % Ce | 15 wt % Sr | 0.15 wt % Rh 1.6 wt % Pt | |
| 105 | 18 wt % Ce | 7 wt % Sr 7 wt % Ca | 0.15 wt % Rh 1.6 wt % Pt | |

The testing manner was similarly to (1), (2) and (3) shown in Experiment 1 and further the composition of the model gas was similarly to that of shown in Experiment 1.

Table 10 shows the NO$_x$ gas purification rate at one minute after the start of flow of the stoichiometric model exhaust gas, and the purification rate one minute after the start of the lean model exhaust gas, obtained by the honeycomb catalyst during the initial period and after SO$_2$ poisoning. The NO$_x$ gas purification rate was calculated according to the formula shown in Experiment 1.

TABLE 10

| Embodiment Catalyst | initial period NO$_x$ purification rate (%) | | NO$_x$ purification rate (%) poisoning by SO$_2$ | | lowering rate (%) of lean to initial |
|---|---|---|---|---|---|
| | stoichio -metric | lean | stoichio -metric | lean | |
| 100 | 100 | 80 | 100 | 75 | −6 |
| 101 | 100 | 50 | 100 | 43 | −14 |
| 102 | 100 | 65 | 100 | 59 | −9 |
| 103 | 100 | 65 | 100 | 50 | −23 |
| 104 | 100 | 47 | 100 | 32 | −32 |
| 105 | 100 | 58 | 100 | 40 | −31 |

Further, the decrease of the lean NO$_x$ gas purification rate by SO$_2$ poisoning was calculated by the following formula.

Lowering rate of NO$_x$ gas purification rate=(initial period NO$_x$ gas purification rate−NO$_x$ gas purification rate after SO$_2$ poisoning)/(initial period NO$_x$ gas purification rate   formula (2)

The decrease of the lean NO$_x$ gas purification rate by SO$_2$ poisoning according to the support of SiO$_2$ is improved at −5%–−15%.

In Embodiment Catalyst 100, the NO$_x$ gas purification rate was measured while the SiO$_2$ supported amount was varied. The catalyst preparation manner and the experimental manner were similarly to those of Embodiment Catalyst 100. The results are shown in Table 11. By supporting SiO$_2$, the initial period NO$_x$ gas purification rate is improved. Further, the support amount of SiO$_2$, was 0.6 wt %–5 wt %, NO$_x$ gas purification rate after SO$_2$ poisoning can obtain 60%.

TABLE 11

| SiO$_2$ supported amount (wt %) | initial period NO$_x$ purification rate (%) | | NO$_x$ purification rate (%) after SO$_2$ poisoning | |
|---|---|---|---|---|
| | stoichiometric | lean | stoichiometric | lean |
| 0 | 100 | 55 | 100 | 50 |
| 0.5 | 100 | 55 | 100 | 50 |
| 0.8 | 100 | 70 | 100 | 63 |
| 1 | 100 | 75 | 100 | 68 |
| 2 | 100 | 80 | 100 | 75 |
| 3 | 100 | 80 | 100 | 75 |
| 4 | 100 | 78 | 100 | 72 |
| 5 | 100 | 65 | 100 | 60 |
| 8 | 100 | 50 | 100 | 53 |
| 9 | 100 | 55 | 100 | 49 |
| 10 | 100 | 50 | 100 | 46 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of purifying an exhaust gas from an internal combustion engine having a lean operation mode, comprising:

providing a catalyst which both chemically adsorbs NO$_x$ and reduces adsorbed NO$_x$ when an amount of a gaseous reducing agent in said exhaust gas is less than stoichiometric with respect to an amount of a gaseous oxidizing agent in the exhaust gas, and which catalyzes a reduction of adsorbed NO$_x$ when the amount of said reducing agent is equal to or more than stoichiometric with respect to the amount of said oxidizing agent in the exhaust gas;

passing said exhaust gas over said catalyst;

operating said engine in said lean combustion mode; and intermittently controlling said amount of said reducing agent present in said exhaust gas to increase it to an amount which is greater than or equal to stoichiometric with respect to an amount of said oxidizing agent in said exhaust gas;

wherein said catalyst comprises at least one member selected from each of the following groups;

a first group consisting of alkali metals, calcium and strontium;

a second group consisting of rare earth metals;

a third group consisting of platinum group metals; and a fourth group consisting of silicon and titanium.

2. Method according to claim 1 wherein said step of intermittently controlling comprises adding an amount of said reducing agent to said exhaust gas.

3. Method according to claim 1 wherein:

said step of intermittently controlling comprises switching said engine to a rich combustion mode.

4. An exhaust gas purification apparatus for an internal combustion engine having a lean operation mode with a lean air fuel ratio of at least 18, comprising:

an exhaust gas duct connected to said engine, through which the exhaust gas containing NOx passes; and a main catalyst disposed in said exhaust gas duct, in contact with the exhaust gas; wherein said main catalyst chemically adsorbs and retains NOx on a surface portion thereof in the presence of said exhaust gas when said engine operates in said lean operation mode;

NOx retained on said main catalyst is reduced to $N_2$ in the presence of said exhaust gas when said engine operates with a rich or stoichiometric air fuel ratio and when said engine operates in said lean operation mode; and said main catalyst comprises at least one member selected from each of the following groups:
- a first group consisting of alkali metals, calcium and strontium;
- a second group consisting of rare earth metals;
- a third group consisting of platinum group metals; and
- a fourth group consisting of silicon and titanium.

5. An exhaust gas purification apparatus according to claim 4 further comprising a timing control unit which outputs a timing signal to determine a period for operation of said engine with a rich or stoichiometric air/fuel ratio.

6. An exhaust gas purification apparatus according to claim 4 wherein said catalyst comprises:
- a heat resistant carrier body; and
- catalytic compounds supported on said carrier body.

7. An exhaust gas purification apparatus according to claim 4, further comprising a manifold catalyst disposed in said exhaust gas duct immediately after the engine, upstream of said main catalyst, said manifold catalyst having functions of a three way catalyst and a combustion catalyst.

8. An exhaust gas purification apparatus according to claim 7, wherein
said manifold catalyst is disposed in an exhaust gas duct of a direct fuel injection engine.

9. An exhaust gas purification apparatus according to claim 4, further comprising one of a three way catalyst and a combustion catalyst disposed in said exhaust gas duct at the upstream of said main catalyst.

10. The exhaust gas purification apparatus according to claim 4, further comprising a second catalyst disposed downstream of said main catalyst, for removing impurities from said exhaust gas.

11. The exhaust gas purification apparatus according to claim 10 wherein said impurities comprise at least one of hydrocarbons, carbon monoxide and NOx.

12. The exhaust gas purification apparatus according to claim 4 wherein NOx retained on said main catalyst is in the form of $NO_2$.

13. The exhaust gas purification apparatus according to claim 4 wherein said at least one member selected from said fourth group is titanium.

14. The exhaust gas purification apparatus according to claim 4 wherein said at least one member selected from said first group is at least one of sodium, potassium and lithium.

15. The exhaust gas purification apparatus according to claim 4 wherein said at least one member selected from said second group is cerium.

16. The exhaust gas purification apparatus according to claim 4 wherein said at least one member selected from said third group comprises platinum and rhodium.

17. The exhaust gas purification apparatus according to claim 4 wherein said at least one member selected from said first group is strontium.

18. The exhaust gas purification apparatus according to claim 4 wherein said main catalyst further comprises magnesium.

19. The exhaust gas purification apparatus according to claim 4, further comprising:
an engine control unit which estimates NOx accumulation during operation of said engine in said lean operation mode, based on detected vehicle operating parameters;
wherein said engine control unit switches said engine to operation with a rich or stoichiometric air fuel ratio when estimated accumulated NOx exceeds a preset value.

20. The exhaust gas purification apparatus according to claim 4, further comprising:
an oxygen sensor arranged in an exhaust gas flow of said engine; and
an engine control unit which determines an accumulated value of oxygen in said exhaust gas, based on an output signal of said oxygen sensor;
wherein said engine control unit switches said engine to operation with a rich or stoichiometric air/fuel ratio when said accumulated value exceeds a predetermined threshold value.

21. The exhaust gas purification apparatus according to claim 20, wherein determination of accumulated oxygen is performed only during operation of said engine in said lean operating mode.

22. The exhaust gas purification apparatus according to claim 20, wherein determination of accumulated oxygen is performed during all operation modes of said engine.

23. The exhaust gas purification apparatus according to claim 4, further comprising:
an NOx sensor disposed upstream of said main catalyst in a flow of said exhaust gas; and
an engine control unit determines an accumulated value of NOx in said exhaust gas, based on an output of said NOx sensor;
wherein said engine control unit switches said engine to operation with a rich or stoichiometric air/fuel ratio when said accumulated value exceeds a predetermined threshold value.

24. The exhaust gas purification apparatus according to claim 4, further comprising:
an NOx sensor disposed downstream of said main catalyst in a flow of said exhaust gas; and
an engine control unit determines an accumulated value of NOx in said exhaust gas, based on an output of said NOx sensor;
wherein said engine control unit switches said engine to operation with a rich or stoichiometric air/fuel ratio when said accumulated value exceeds a predetermined threshold value.

25. The exhaust gas purification apparatus according to claim 4, wherein said internal combustion is a gasoline engine.

26. An exhaust gas purification apparatus for an internal combustion engine having a lean operation mode with a lean air fuel ratio, comprising:
an exhaust gas duct connected to said engine, through which the exhaust gas containing NOx passes; and
a main catalyst disposed in said exhaust gas duct, in contact with the exhaust gas; wherein
said main catalyst chemically adsorbs and retains NOx on a surface portion thereof in the presence of said exhaust gas when an amount of a reducing agent in said exhaust gas is less than stoichiometric with respect to an amount of oxidizing agent in said exhaust gas;
NOx retained on said main catalyst is reduced to $N_2$ in the presence of said exhaust gas when an amount of a reducing agent in said exhaust gas is equal to or more than stoichiometric with respect to an amount of oxidizing agent in said exhaust gas, and when said engine operates in said lean operation mode; and
said main catalyst comprises at least one member selected from each of the following groups:
a first group consisting of alkali metals, calcium and strontium;

a second group consisting of rare earth metals;
a third group consisting of platinum group metals; and
a fourth group consisting of silicon and titanium.

27. An exhaust gas purification apparatus according to claim 26 wherein
said reducing agent present in the lean combustion exhaust gas is at least one of gasoline, light oil, kerosene, natural gas, their reformed substances, hydrogen, alcohol, ammonia gas, engine blow by gas and canister purging gas.

28. An exhaust gas purification apparatus according to claim 26, further comprising a timing control unit, wherein said reducing agent is supplied to the lean combustion exhaust gas in response to signals from said timing control unit.

29. The apparatus for purifying an exhaust gas according to claim 26, wherein:
said main catalyst chemically adsorbs $NO_x$ when the exhaust gas is emitted from lean combustion;
$NO_x$ adsorbed by said catalyst is catalytically reduced when a gaseous reducing agent is added to the lean combustion exhaust gas; and
said catalyst adsorbs or absorbs SOx in a lean condition, and releases SOx in a stoichiometric or rich condition.

* * * * *